(12) United States Patent
Cordray

(10) Patent No.: US 8,627,378 B2
(45) Date of Patent: Jan. 7, 2014

(54) SYSTEMS AND METHODS FOR CREATING AGGREGATIONS OF EPISODES OF SERIES PROGRAMMING IN ORDER

(75) Inventor: Charles Cordray, New York, NY (US)

(73) Assignee: United Video Properties, Inc., Santa Clara, CA (US)

( * ) Notice: Subject to any disclaimer, the term of this patent is extended or adjusted under 35 U.S.C. 154(b) by 172 days.

(21) Appl. No.: 13/049,469

(22) Filed: Mar. 16, 2011

(65) Prior Publication Data

US 2012/0033950 A1  Feb. 9, 2012

Related U.S. Application Data

(63) Continuation of application No. 12/553,492, filed on Sep. 3, 2009, now abandoned, which is a continuation of application No. 11/324,183, filed on Dec. 29, 2005, now abandoned.

(51) Int. Cl.
*H04N 5/445* (2011.01)
*H04N 5/76* (2006.01)

(52) U.S. Cl.
USPC ............... 725/58; 725/61; 386/291; 386/296; 386/297

(58) Field of Classification Search
USPC ................................ 725/58, 61; 386/296, 297
See application file for complete search history.

(56) References Cited

U.S. PATENT DOCUMENTS

| | | |
|---|---|---|
| 4,488,179 A | 12/1984 | Krüger et al. |
| 4,706,121 A | 11/1987 | Young |
| 4,750,036 A | 6/1988 | Martinez |
| 4,751,578 A | 6/1988 | Reiter et al. |
| 4,841,132 A | 6/1989 | Kajitani et al. |
| 4,847,696 A | 7/1989 | Matsumoto et al. |
| 4,879,611 A | 11/1989 | Fukui et al. |
| 4,908,713 A | 3/1990 | Levine |
| 4,977,455 A | 12/1990 | Young |
| 4,980,713 A | 12/1990 | Fujita et al. |

(Continued)

FOREIGN PATENT DOCUMENTS

| | | |
|---|---|---|
| EP | 0 721 253 | 7/1996 |
| EP | 1355489 A2 | 10/2003 |

(Continued)

OTHER PUBLICATIONS

"Electronic Program Guide Via Internet", Research Disclosure Bulletin, No. 385:276, May 1996, p. 276.

(Continued)

*Primary Examiner* — Robert Hance
(74) *Attorney, Agent, or Firm* — Ropes & Gray LLP

(57) ABSTRACT

A viewer of an episode of a series such as a television series may wish to access episodes of the series that the viewer missed when they were originally broadcast. Interactive applications may receive the viewer's indication of interest to record missed episodes of the incomplete series, which may include instructions regarding recording options for including the missed episodes in a series aggregation. Interactive applications may identify the episodes to be included in the series aggregation, and record the missed episodes, which may then be stored and organized to create a series aggregation, in the order that they were first broadcast with episodes that the viewer may already have available. Interactive applications may present the episodes of the series aggregation in the order that they were originally broadcast, by providing the viewer with options on how to access the episodes.

37 Claims, 19 Drawing Sheets

(56) References Cited

U.S. PATENT DOCUMENTS

| | | |
|---|---|---|
| 5,151,789 A | 9/1992 | Young |
| 5,187,589 A | 2/1993 | Kono et al. |
| 5,293,357 A | 3/1994 | Hallenbeck |
| 5,335,277 A | 8/1994 | Harvey et al. |
| 5,353,121 A | 10/1994 | Young et al. |
| 5,357,276 A | 10/1994 | Banker et al. |
| 5,523,796 A | 6/1996 | Marshall et al. |
| 5,583,560 A | 12/1996 | Florin et al. |
| 5,592,551 A | 1/1997 | Lett et al. |
| 5,594,509 A | 1/1997 | Florin et al. |
| 5,596,361 A | 1/1997 | Martinez |
| 5,596,373 A | 1/1997 | White et al. |
| 5,619,247 A | 4/1997 | Russo |
| 5,635,978 A | 6/1997 | Alten et al. |
| 5,635,989 A | 6/1997 | Rothmuller |
| 5,684,525 A | 11/1997 | Klosterman |
| 5,699,107 A | 12/1997 | Lawler et al. |
| 5,798,785 A | 8/1998 | Hendricks et al. |
| 5,801,787 A | 9/1998 | Schein et al. |
| 5,805,763 A | 9/1998 | Lawler et al. |
| 5,812,123 A | 9/1998 | Rowe et al. |
| 5,850,218 A | 12/1998 | LaJoie et al. |
| 5,883,677 A | 3/1999 | Hofmann |
| 5,949,954 A | 9/1999 | Young et al. |
| 5,995,155 A | 11/1999 | Schindler et al. |
| 6,058,242 A | 5/2000 | Kim |
| 6,177,931 B1 | 1/2001 | Alexander et al. |
| 6,208,799 B1 | 3/2001 | Marsh et al. |
| 6,323,911 B1 | 11/2001 | Schein et al. |
| 6,348,932 B1 | 2/2002 | Nishikawa et al. |
| 6,373,528 B1 | 4/2002 | Bennington et al. |
| 6,388,714 B1 | 5/2002 | Schein et al. |
| 6,611,958 B1 | 8/2003 | Shintani et al. |
| 6,850,693 B2 | 2/2005 | Young et al. |
| 6,973,663 B1 | 12/2005 | Brown et al. |
| 2002/0057893 A1* | 5/2002 | Wood et al. ............ 386/46 |
| 2003/0167471 A1* | 9/2003 | Roth et al. ............. 725/87 |
| 2003/0208763 A1 | 11/2003 | McElhatten et al. |
| 2004/0111756 A1 | 6/2004 | Stuckman et al. |
| 2004/0117831 A1 | 6/2004 | Ellis et al. |
| 2004/0187164 A1* | 9/2004 | Kandasamy et al. ..... 725/132 |
| 2005/0055715 A1 | 3/2005 | Minnick et al. |
| 2005/0204388 A1 | 9/2005 | Knudson et al. |
| 2005/0240968 A1 | 10/2005 | Knudson et al. |
| 2005/0271363 A1 | 12/2005 | Tanikawa |
| 2005/0273819 A1 | 12/2005 | Knudson et al. |
| 2006/0062550 A1* | 3/2006 | Lee ......................... 386/83 |
| 2007/0107010 A1* | 5/2007 | Jolna et al. ............. 725/34 |
| 2008/0077957 A1 | 3/2008 | Schein et al. |
| 2010/0175090 A1 | 7/2010 | Cordray |

FOREIGN PATENT DOCUMENTS

| | | |
|---|---|---|
| GB | 2 210 526 | 6/1989 |
| JP | 60-61935 A | 4/1985 |
| JP | 63-054884 A | 3/1988 |
| JP | 63141467 A | 6/1988 |
| JP | 01209399 A | 8/1989 |
| JP | 1212986 A | 8/1989 |
| JP | 01307944 A | 12/1989 |
| JP | 10247344 A | 9/1998 |
| JP | 2002-335463 A | 11/2002 |
| JP | 2003-304503 A | 10/2003 |
| JP | 2004-343520 A | 12/2004 |
| JP | 1078328 | 5/2009 |
| WO | WO-89/03085 | 4/1989 |
| WO | WO-9204801 | 3/1992 |
| WO | WO-9609721 | 3/1996 |
| WO | WO-9617473 | 6/1996 |
| WO | WO-9730546 | 8/1997 |
| WO | WO-97/48230 | 12/1997 |
| WO | WO-98/06219 | 2/1998 |
| WO | WO-00/08852 | 2/2000 |
| WO | WO-01/69929 A1 | 9/2001 |
| WO | WO-2006/060157 A2 | 6/2006 |

OTHER PUBLICATIONS

"IS-60.3 Physical Layer and Medium Specifications. Part 3-CX Physical Layer & Medium Specification," CX Specification, Revised Mar. 19, 1992, Table of Contents (2 pp.) and pp. 1-41.

Davidson, Ken, "CEBus: A New Standard in Home Automation" Circuit Cellar Ink, pp. 40-52 (1989).

Declaration of Rosetta Rogers Under 37 CFR 1.131 in U.S. Appl. No. 09/393,955.

Hofmann, J., "The Consumer Electronic Bus: An Integrated Multi-Media LAN for the Home," International Journal of Digital and Analog Communication Systems, vol. 4, No. 2, 1991, pp. 77-86.

O'Brien, Jr., T. E., "Physical and Media Specifications of the CXBus," IEEE Transactions on Consumer Electronics, vol. 37, No. 3, Aug. 1991, pp. 357-366.

StarSight User's Manual.

"Digital Video Broadcasting (DVB); DVB specification for data broadcasting", European Telecommunications Standards Institute, Draft EN 301 192 V1.2.1. (1999-02).

* cited by examiner

200

| Episodes of the Series Aggregation | 202 |
| Recorded Episodes of the Series Aggregation | 204 |
| Missed Episodes of the Series Aggregation | 206 |
| Missed Episodes of the Series Aggregation Scheduled for Recording | 208 |
| Missed Episodes of the Series Aggregation Unavailable for Recording | 210 |

| Missed Episode Identifier | 302 |
| Date/Time/Channel of Availability for a Missed Episode | 304 |
| Media Source Where Missed Episode is Available | 306 |
| Format of Missed Episode | 308 |
| History of Missed Episode | 310 |

| Recorded Episode Identifier | 402 |
| Media Source of Recorded Episode | 404 |
| Format of Recorded Episode | 406 |
| History of Recorded Episode | 408 |

DIGITAL CABLE     7:03 pm     TV GUIDE

The Sopranos
7-8 p
"Meadowlands", The power struggle

164 HBO
TV MA

| | | 8:00 p |
|---|---|---|
| Thu | | |
| 6 CBS | King | Everybody Loves... |
| 7 ABC | | Monday... |
| 8 NBC | | ER |
| 9 FOX | The Simpsons: The Treehouse... | King of the Hill |
| 164 HBO | The Sopranos | Entourage |

ALERT FOR COMPLETE SERIES AGGREGATION

*SPIDERMAN*
Tonight 9:30p on HBO

FIG. 12B

DIGITAL CABLE — 7:03 pm — TV GUIDE

The Sopranos
7-8 p
"Meadowlands", The power struggle ...

| | 8:00 p | 164 HBO / TV MA |
|---|---|---|
| Thu | | |
| 6 CBS | King... Everybody Loves ... | |
| 7 ABC | | Monday ... |
| 8 NBC | | ER |
| 9 FOX | The Simpsons: The Treehouse ... | King of the Hill |
| 164 HBO | The Sopranos | Entourage |

ALERT FOR INCOMPLETE SERIES AGGREGATION

*SPIDERMAN*
Tonight 9:30p on HBO

1202

1300

DIGITAL
CABLE

7:03 pm [TV GUIDE]

The Sopranos
(Drama, Series)

☆☆☆ [TV MA] ○
Jerry Adler, Drea Dematteo

Do you want to access episodes of a series on-demand?
  If so, click [Here]— 1304
Do you want to receive episodes of a series on a DVD?
  If so, click [Here]— 1306
Do you want to purchase episodes of a series?
  If so, click [Here]— 1308
Do you want to download episodes of a series?
  If so, click [Here]— 1310
Do you want to create a series aggregation?
  If so, click [Here]— 1312

FIG. 13

SYSTEMS AND METHODS FOR CREATING AGGREGATIONS OF EPISODES OF SERIES PROGRAMMING IN ORDER

CROSS-REFERENCE TO RELATED APPLICATION

This application is a continuation of prior U.S. patent application Ser. No. 12/553,492 filed Sep. 3, 2009, which is a continuation of U.S. patent application Ser. No. 11/324,183 filed Dec. 29, 2005 (now abandoned). The prior applications are hereby incorporated by reference herein in their entirety.

BACKGROUND OF THE INVENTION

This invention relates to interactive media guidance systems and more particularly to interactive media guidance systems that record media presented as episodes in a series, such as episodes of a television program series, any other program series, or any other type of series. This invention is an improvement on the basic series recording functionality that exists today (sometimes called a "Season Pass"). Series recording functionality relates to a user selecting to record a program that is part of a series. When the user selects to record a program that is part of a series, a media guidance system automatically schedules to record each episode of the series that is aired or will record "new" episodes of the series that are aired for the first time.

When users of an interactive media guidance system discover a series late (such as late in the season of a television program series), or miss viewing or recording some or all episodes of a series (within a season or one or more seasons of an entire series), it is often difficult for users to access or to view the episodes of the series in episode order or to capture the repeats (i.e., re-runs) of episodes that were not originally recorded. While many, most, or all episodes of a series may become available over time (as re-runs), not all episodes may be available at once or in the order that they were presented in the series. For example, a television program series may be in syndication, but not all episodes of the television program series may be available at one time, and some episodes may never be re-run.

Some media content may be episodic content. Episodic content typically is self-contained within each episode and does not include a common storyline with other episodes of the media content. For example, episodes of the series "Seinfeld" are typically episodic. Viewers may watch one episode without watching all of the previous episodes in the series to understand the story. However, other media content may be serial in nature. Serial programming is any programming containing a temporal component, such as a recommended order of viewing. Serial programming may share themes and/or plot sequences with other episodes in the series.

An example of serial programming includes episodes of the series "24." A user who watches an episode of the series "24" out of sequence may not recognize or understand certain characters, themes, or plot elements that were introduced in previous unwatched episodes. This often causes the viewer to be confused or to lose interest in the media content. To comprehend episodes of serial programming fully, other related programming must typically be watched prior to watching the serial programming, or the serial programming must be watched in the order that it was originally presented.

Thus, for serial series, while the sequence for future viewing is particularly important, re-runs of episodes of the series will not always be available in the sequence that they were originally presented. Sequence may be important for some episodic series as well. For example, a user who watches some episodes of the series "Seinfeld" out of sequence may not recognize or understand certain characters, themes, or plot elements that were introduced in previous unwatched episodes. Even when television programs are in re-runs in their original season, not all episodes are necessarily provided, and the episodes that are provided may not be provided in sequence. Viewers may also simply miss an episode or series of episodes.

It is therefore desirable to provide systems and methods that may allow users to record some or all episodes of a series conveniently and thereby to view the episodes of a series in order.

SUMMARY OF THE INVENTION

In accordance with the principles of the present invention, an interactive media guidance application is provided that may present, in the order that the episodes were originally presented, a desired group of episodes of a past or current series. This desired group of episodes will be referred to herein as a "series aggregation." As will be described in greater detail below, the series aggregation is created by collecting (e.g., compiling or recording from a remote server, an on-demand server, any other suitable server, a recording device, broadcast, or any other suitable source) episodes out of the order in which they were originally presented and may present the episodes of the series aggregation in the order in which they were originally presented. The series aggregation may be episodes from one or more seasons of a series, a user- or application-selection of episodes of a series, or any other desired group of episodes.

One or more episodes within a series aggregation may already be recorded on a recording device, may already be available on-demand from a server, or may already be available through any other suitable means. Episodes that are not already recorded on a recording device, already available on-demand from a server, or already available through any other suitable means will be referred to herein as missed episodes, regardless of whether the user has previously watched or recorded the episode. In some embodiments, no episodes of a series aggregation will have been recorded, available on-demand from a server, or available through any other suitable means prior to a user indicating a desire to create a series aggregation—i.e., in this case all episodes may be considered missed episodes.

The media guidance application may receive a user's instruction to record missed episodes of a series aggregation. In one embodiment, user's instructions may simply be a user requesting the media guidance application to record missed episodes of a series aggregation using either a text or voice entry. For example, a user may simply call a toll-free number and instruct the media guidance application to record missed episodes of a series aggregation by saying, "Create series aggregation of The Sopranos Season One." In another embodiment, the media guidance application may be an online website, in which the titles and seasons of various media are offered as prompts, and the user may select from menus of available media. In response to the user's instruction, the media guidance application may query one or more media sources for the missed episodes and record them. The media guidance application may organize the missed episodes in order with the episodes that the user has already recorded (if any have been recorded) or that are already available (e.g. on-demand from a server) to create an aggregation of episodes that allows the user to watch episodes of the series in order (i.e., a series aggregation).

In some embodiments, the media guidance application may wait until all of the episodes of a series aggregation have been recorded before prompting the user to playback the episodes in order. In other embodiments, the media guidance application may prompt the user to begin watching episodes after a predefined number of sequential episodes has been recorded (e.g., the first three episodes of a series aggregation).

As indicated above, the series aggregation may be for a past series or a current series. In a past series, all missed episodes in the series aggregation have already been originally presented (e.g., broadcast, premiered via video-on-demand, etc.). When creating a series aggregation for a past series, all missed episodes to be recorded are considered re-runs or repeats of the original presentation of the program.

By convention, numbering of episodes may be in the order that the episodes were originally presented. For example, episode 1.1 may be the first episode in the first season of the series (or series aggregation) that was originally presented, episode 1.2 may be the next or second episode in the first season of the series that was originally presented, and so on until the last episode in the first season of the series that was originally presented. Episode 2.1 may then be the first episode in the second season of the series, episode 2.2 may be the next or second episode in the second season, and so on until the last episode in the second season of the series, and the last episode in the last season of the series. Thus, episodes may be identified as x.y, where x is the season number, and y is the episode number in season x.

For a current series, the series aggregation may include originally presented episodes, but may also include original presentations of one or more episodes that will occur in the future. For example, a season of a program may include 23 episodes. Episodes 1.1-1.11 may have already been originally presented, episode 1.12 is currently being originally presented (i.e., broadcasted), and episodes 1.13-1.23 will be originally presented in the future. At the current time, the media guidance application may receive a user's instruction to create a series aggregation for this program. To create this series aggregation, the media guidance application may record episodes 1.1-1.11 in the manner in which the media guidance application records missed episodes (described below). If episode 1.12 is currently being presented, the media guidance application may record this program if it is available for recording or may treat this program as a missed episode if the user did not tune to the program in time to capture the whole program as a recording. Episodes 1.13-1.23 may be recorded when they are originally presented in the future. Episodes 1.13-1.23 may still be considered missed episodes and the description of missed episodes herein may apply equally to episodes of a program that are originally presented in the future. Episodes of a series that are originally presented in the future may be considered a missed episode because a user may not watch a series aggregation until episodes in a series aggregation have been recorded. Thus, the original presentation of these episodes will be missed by the user.

Until all episodes of a series aggregation have been recorded, the series aggregation may be considered an incomplete series or an incomplete series aggregation. When recording missed episodes of an incomplete series aggregation, the media guidance application may record, in some embodiments, only missed episodes. In other embodiments, the media guidance application may also record non-missed episodes when it is desirable to replace a copy of an episode that the user has recorded (e.g., to replace a standard-definition copy with a high-definition one).

The media guidance application may record missed episodes of an incomplete series aggregation from any accessible source of media (although in some embodiments only certain predefined sources may be used). For example, the media guidance application may determine whether missed episodes will be provided as television programs over the user's broadcast, cable or satellite delivery system, Internet, Internet protocol television (IPTV) or any other means, and may schedule the missed episodes for recording. The media guidance application may, for example, query a video-on-demand (VOD) server in the user's television delivery system or another on-demand media server (such as a website), and record missed episodes on demand.

The media guidance application may also, for example, provide the user with an option to wait for the series aggregation to be available after the episodes are available from the user's "free" sources, or to pay a certain amount of money immediately to get the series aggregation on-demand, on a DVD, or any other suitable option. The media guidance application may also, for example, provide the user with information on how long the user would have to wait until the episodes are available from the user's "free" sources, so that the user can make a decision whether to pay a certain amount of money immediately to get the series aggregation on-demand, on a DVD, or any other suitable option. Also, the media guidance application may make the decision whether to get the series aggregation on-demand, on a DVD, or any other suitable option automatically based on user preferences. For example, the user may set the media guidance application always to pay a certain amount of money immediately to get the series aggregation on-demand, on a DVD, or any other suitable option, when the user would have to wait more than three months or any other user-defined time until the episodes are available from the user's "free" sources.

Missed episodes may be recorded using any suitable approach. In some embodiments, a missed episode may be recorded when it becomes available to the media guidance application. For example, an episode of a series may be recorded when it is broadcast, or may be downloaded immediately if available on demand. The episode may be recorded on the user's equipment or on a remote recording device (e.g., a remote server) for the user. In other embodiments, identifiers such as unique resource identifiers, episode identification numbers or universal resource locators (URLs) may be stored by the media guidance application. The media guidance application may retrieve the actual episode from the appropriate source when the user instructs the application to play the episode back.

In some embodiments, the interactive media guidance application may provide a display having options the user may select to indicate how the user wishes to view missed episodes. The options may include, for example: setting alerts for when an entire series is available from a media provider or across different media providers accessible to the user's equipment; aggregating episodes of a series; accessing episodes on-demand; obtaining a DVD of episodes; purchasing episodes via PPV if available; and downloading episodes of a series that are new to the user.

Further features of the invention, its nature, and various advantages will be more apparent from the accompanying drawings and the following detailed description of the preferred embodiments.

BRIEF DESCRIPTION OF THE DRAWINGS

FIG. 2 is a diagram of one embodiment of an episode list data structure in accordance with one embodiment of the present invention.

FIG. 3 is a diagram of one embodiment of a missed episode identifier list data structure in accordance with one embodiment of the present invention.

FIG. 4 is a diagram of one embodiment of a recorded episode identifier list data structure in accordance with one embodiment of the present invention.

FIG. 12A shows an illustrative notification display screen for a complete series aggregation in accordance with one embodiment of the present invention.

FIG. 12B shows an illustrative notification display screen for an incomplete series aggregation in accordance with one embodiment of the present invention.

FIG. 13 shows an illustrative display screen with series aggregation options in accordance with one embodiment of the present invention.

DETAILED DESCRIPTION OF THE PREFERRED EMBODIMENTS

Figure 1A:
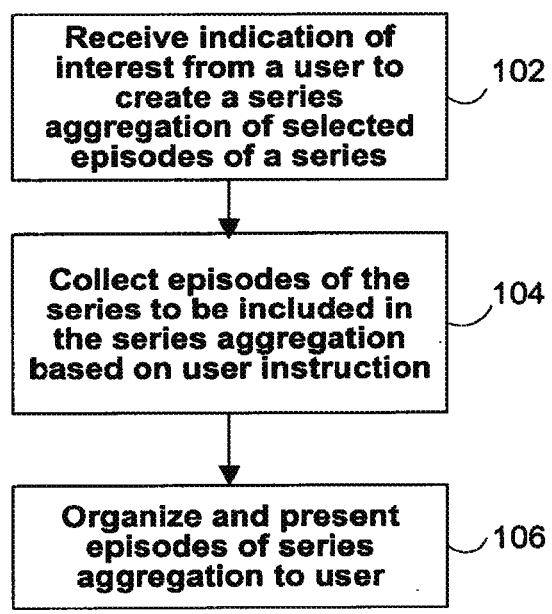
FIG. 1A shows an illustrative flow diagram for creating a series aggregation of missed episodes of a series in accordance with one embodiment of the present invention.

The amount of media available to users in any given media delivery system can be substantial. Consequently, many users desire a form of media guidance, an interface that allows users to efficiently navigate media selections and easily identify media that they may desire. An application which provides such guidance is referred to herein as an interactive media guidance application or, sometimes, a media guidance application or a guidance application.

Interactive media guidance applications may take various forms depending on the media for which they provide, guidance. One typical type of media guidance application is an interactive television program guide. Interactive television program guides are well-known guidance applications that, among other things, allow users to navigate among and to locate television programming viewing choices and, in some systems, digital music choices. The television programming (and music programming) may be provided via traditional broadcast, cable, satellite, Internet, IPTV or any other means. The programming may be provided on a subscription basis (sometimes referred to as premium programming), as pay-per-view programs, or on-demand such as in video-on-demand (VOD) systems. The providers of the different types of programming may be referred to herein as media sources.

With the advent of the Internet, mobile computing, and high-speed wireless networks, users are able to access media on personal computers (PCs) and devices on which they traditionally could not. Non-television-centric platforms (i.e., platforms that distribute media with equipment not part of the user's broadcast, cable or satellite television-delivery network) allow users to navigate among and locate desirable video clips, full motion videos (which may include television programs), images, music files, and other suitable media. Consequently, media guidance is also necessary on modern non-television-centric platforms. For example, media guidance applications may be provided as online applications (i.e., provided on a web-site), or as stand-alone applications or clients on hand-held computers, personal digital assistants (PDAs), or cellular telephones. In some systems, users may control equipment remotely via a media guidance application. For example, users may access an online media guide and set recordings or other settings on their in-home equipment. This may be accomplished by the online guide controlling the user's equipment directly or via another media guide that runs on the user's equipment. Remote access of interactive media guidance applications is discussed in greater detail in U.S. patent application Ser. No. 11/246,392, filed Oct. 7, 2005, which is hereby incorporated by reference herein in its entirety.

For purposes of illustration, the present invention will be described herein as relating to television-centric approaches, but this is not meant to limit the invention. For example, the present invention may be applied to presenting in the order originally presented other types of media, such as audio series or on-demand media series (e.g., web sites that only make available one episode or a subset of episodes of a series at a time).

An illustrative interactive media guidance system in accordance with the present invention will be described herein, e.g., in connection with FIGS. 14-19. Where appropriate, references to an illustrative media guidance system as it relates to the present invention will also appear in connection with the description of the processes, data structures, and display screens, e.g., in connection with FIGS. 1-13.

A media guidance application in accordance with the present invention is provided that presents, in the order that the episodes were originally presented, a desired group of episodes of a past or current series (i.e., a series aggregation). The creation of a series aggregation may be desirable when a user of an interactive media guidance system discovers a series late (such as late in the season of a television program series or after the season of a television program series has completed), or misses viewing or recording some episodes of a series. For a program that is a serial series, the sequence for future viewing is particularly important, but re-runs of episodes of the series will not always be available in the sequence that they were presented. The creation of a series aggregation, such that the media guidance application collects (i.e., compiles or records from a remote server, an on-demand server, any other suitable server, a recording device, broadcast, or any other suitable source) a desired group of episodes, enables a user to view the episodes in the order in which they were originally presented.

The series aggregation may be episodes from one or more seasons of a television program series, a user or application selection of episodes of a series, or any other desired group of episodes. The selection of episodes of a series may be a subset of episodes that are a sequence of episodes within a season (e.g., television program series "The Sopranos," episodes 3.4-3.16), a sequence of episodes within more than one season (e.g., "The Sopranos," episode 4.16 through episode 5.2), non-sequential episodes of one or more seasons (e.g., "The Sopranos," episodes 1.1, 1.4, 1.5, and 1.7), a special sequence of episodes (e.g., all the first and/or last episodes of each season of "The Sopranos"), or any other desired subset of episodes of a series within one or multiple seasons.

Once all episodes of a series aggregation have been recorded, the series aggregation may be considered a complete series aggregation. Until all episodes of a series aggregation have been recorded, the series aggregation may be considered an incomplete series aggregation. The general term "series aggregation" may be referred to herein as either a complete or incomplete series aggregation or both, where appropriate. The general term "series aggregation" is not meant to be limited to a complete or incomplete series aggregation, unless described as such.

FIG. 1A shows illustrative process 100 for creating a series aggregation that may be used in accordance with some embodiments of the present invention. At step 102, an interactive media guidance application may receive an indication of interest from a user to create a series aggregation of selected episodes of a series. In one embodiment, user's instructions may simply be a user requesting the media guidance application to record missed episodes of a series aggregation using either a text or voice entry. For example, user equipment device may include a user microphone. A user may simply instruct the media guidance application to record missed episodes of a series aggregation by saying into the microphone, "Create series aggregation of The Sopranos Season One."

In an alternate embodiment, user equipment device may include a keyboard, remote control, or other suitable device for free text entry or for making choices among presented options, such as a remote control for a menu or a mouse for PC navigation. A user may simply instruct the media guidance application to record missed episodes of a series aggregation by entering free text to a display screen using the keyboard, remote control, or other suitable device. Systems and methods for receiving a user instruction to create a series aggregation are discussed in greater detail below, e.g., in connection with the display screens of FIGS. 5-11 and the data structure of FIGS. 2-4.

At step 104, episodes of the selected series to be included in the series aggregation may be collected. Episodes may be collected by the media guidance application by compiling or recording them from a remote server, an on-demand server, any other suitable server, a recording device, broadcast, or any other suitable source. After episodes are collected by the media guidance application at step 104, then process 100 may proceed to step 106.

At step 106, the episodes of the complete series aggregation may be organized and displayed in the order in which they were originally presented. The media guidance application may also inform the user that the series aggregation is complete by displaying a list of all episodes in the series aggregation in the order in which each episode was originally presented. Informing the user when the series aggregation is complete and displaying the series aggregation may be performed in various ways and will be discussed below in greater detail, e.g., in connection with a further description of step 116 and FIGS. 2-4.

Figure 1B:
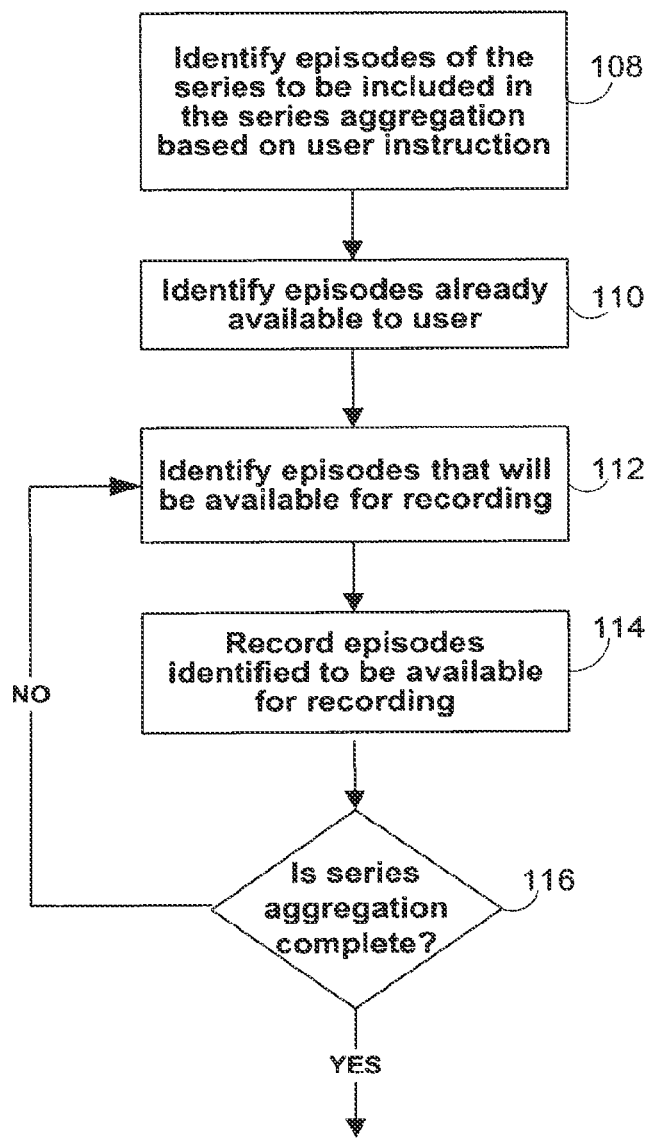
FIG. 1B shows an illustrative flow diagram for collecting episodes of a series to be included in a series aggregation in accordance with another embodiment of the present invention.

FIG. 1B shows illustrative substeps of step 104 for collecting episodes of a series to be included in a series aggregation that may be used in accordance with other embodiments of the present invention. At step 108, episodes of the series to be included in the series aggregation may be identified based on the user's instruction. The episodes identified in step 108 may include all the episodes of the series aggregation. The episodes identified may be, for example, all episodes of a season of a program series. For illustration of the invention, a season of a program series "The Sopranos" may be discussed herein as the desired group of episodes for a series aggregation. This is not meant, however, to limit the invention to only this desired group of episodes of this program. In this illustrative example, it will also be assumed that there are 23 episodes in the season of the program series "The Sopranos."

At step 110, the interactive media guidance application may identify episodes of the series aggregation that are already available to the user. An episode may be identified as available to the user if it is found located in a storage device in a home network and/or other local or remote storage devices that have recorded programs available to the user. All episodes that have been recorded that are available to the user may be used to complete the series aggregation and in some embodiments it may not be necessary to record these episodes again as part of creating the series aggregation. Further details regarding storage devices and recording episodes on storage devices are discussed in greater detail below, for example in connection with the system description in FIGS. 14-19.

At step 112 shown in FIG. 1B those episodes that are currently considered missed episodes that are available for recording may be identified. An available missed episode may be an episode of the series aggregation that needs to be recorded to complete the series aggregation and that may be known to be available from one or more queried media sources currently or at some known time in the future. Further systems and methods for querying one or more media sources to determine availability of programming will be discussed in greater detail below, e.g., in connection with FIGS. 2-4 and 14-19. Examples of the one or more sources from which the media guidance application may acquire and record missed episodes include traditional broadcast, cable, or satellite programming media sources and subscription-based media sources or purchase-based media sources, pay-per-view, VOD, Internet downloads, DVD providers, IPTV or any other type of media source.

At step 114 shown in FIG. 1B, the media guidance application may record missed episodes that have been identified as available in step 112 (described below). At decision block 116 a determination may be made whether the series aggregation is complete. The series aggregation may be considered complete if all episodes of the series aggregation have been recorded for the user based on the performance of steps 110, 112, and 114.

If the series aggregation is determined to be complete at decision block 116, then process 100 shown in FIG. 1A may proceed to step 106. If the series aggregation is determined to be incomplete at decision block 116 shown in FIG. 1B, then process 100 shown in FIG. 1A may return to step 112 shown in FIG. 1B to further identify missed episodes that are available for recording.

In practice, one or more steps shown in process 100 of FIG. 1A may be combined with other steps, performed in any suitable order, modified, performed in parallel—e.g., simultaneously or substantially simultaneously—or deleted. For example, in one embodiment, step 110 shown in FIG. 1B may be deleted if it is desirable for the media guidance application to acquire all episodes of the series aggregation, regardless of whether some episodes are already available. In other embodiments, step 110 may be bypassed if the media guidance application determines that no episodes are already available to the user.

In some embodiments, the return to step 112 from decision block 116 when a determination is made that the series aggregation is complete may be modified. For example, in some embodiments the return to step 112 may occur continuously until missed episodes are identified as being available for recording. In other embodiments, the return to step 112 may occur at a predetermined time interval (e.g., every 10 minutes, every 30 minutes, every hour, every 12 hours, once a day, etc.). The return to step 112 may occur based on an event, such as when the media guidance application receives new program data information. When the media guidance application receives new program data information, this may indicate that more missed episodes may become available shortly in the future that were not available previously.

In some embodiments, recording missed episodes at step 114 may involve setting up an episode of the series aggregation for recording, and recording the episode at a later time. Therefore, the actual recording of the episode may occur after reaching decision block 116 because the episode may not be broadcast until some future time. In this embodiment, the determination of whether a series aggregation is complete at decision block 116 may involve determining if all episodes are already recorded or scheduled for recording. If this test is satisfied, process 100 shown in FIG. 1A may still proceed to step 106, but the media guidance application may not inform a user that the series aggregation is complete yet because some episodes have not been recorded, because these episodes may not be broadcast until some future time (i.e., the series aggregation is incomplete). In this embodiment all missed episodes have been identified as available currently or at some future time and are being currently recorded or will be recorded at some known future time. In other embodiments, the media guidance application may present the series aggregation, but may inform the user that the series aggregation is incomplete. In another example, a user may access an incomplete series aggregation at any step in process 100. For example, it may be desirable to access the series aggregation after step 110 shown in FIG. 1B when the episodes already available to the user have been identified.

A complete or incomplete series aggregation may be accessed by displaying a list of all episodes in the series aggregation, where the episodes are displayed in the order in which each episode was originally presented. As described above, in some embodiments, the media guidance application may inform a user that a series aggregation is complete at step 106 shown in FIG. 1A. In other embodiments, the media guidance application may display an incomplete series aggregation. When an incomplete series aggregation is displayed, the media guidance application may indicate which of the episodes have been recorded, which episodes are scheduled for recording, and which episodes are not available for recording (see, e.g., FIG. 10). In some embodiments, when an incomplete series aggregation is provided, only those episodes that have been recorded may be displayed. In other embodiments, only those episodes that have been recorded may be displayed with the episodes scheduled for recording or the episodes that are not available for recording. In some embodiments it may be desirable to display the missed episodes.

It may be desirable to access an incomplete series aggregation if a part of a specified sequence of episodes of the series aggregation has been recorded. For example, if episodes 2.1-2.3 and episodes 2.7-2.10 of "The Sopranos" are available, the media guidance application may begin to present the series aggregation. In this example, the user may watch episodes 2.1-2.3 and in the interim time in which the user is watching the episodes, the media guidance application may find that one or more of episodes 2.4-2.6 and 2.11-2.23 have become available and may be recorded. The media guidance application would essentially begin presenting an incomplete series aggregation from the beginning and fill in the gaps of the later missing episodes (i.e., complete the series aggregation) as the user is watching the beginning episodes.

It will be appreciated that other specified sequences of incomplete series aggregations may be accessed prior to completion. For example, continuing the same example, in some embodiments, the user may begin watching at episode 2.7 and watch episodes 2.7-2.10, while the media guidance application gathers the remaining episodes of the series aggregation from episode 2.11 onward. This may be desirable because the media guidance application may monitor a viewer's viewing history and be aware that the user has viewed or played episodes 2.1-2.6 previously. Systems and methods for monitoring viewing histories to determine programming that has been viewed or played is discussed in greater detail in connection with Ellis et al., U.S. patent application Ser. No. 09/374,043, filed Aug. 13, 1999, now U.S. Pat. No. 6,898,762, Ellis et al., U.S. patent application Ser. No. 10/105,128, filed Feb. 21, 2002, and Cordray et al., U.S. patent application Ser. No. 11/324,212, filed Dec. 29, 2005, which are hereby incorporated by reference herein in their entireties, and below in connection with FIGS. 3, 4 and 9.

In embodiments where a series aggregation is incomplete, a user may be provided with an opportunity to access and purchase, if necessary, missed episodes on-demand (e.g., video on-demand or VOD), from pay-per-view (PPV), from a DVD, downloading via the Internet, or in any other manner of accessing episodes other than from a broadcast media source. This embodiment may be desirable to a user if one or more episodes of a series aggregation are not available, or are available from a broadcast media source, but at a time in the future that is not desirable to the user. The time in the future may not be desirable to the user because the user would like to watch those one or more episodes of the series aggregation sooner than the time in the future when the program may be recorded by the user's recording device. For example, the system may prompt the user with, "You have all but three episodes, and those three are available for purchase at $1.99 each. Buy now?" or "The system has been searching for two missing episodes for more than 90 days. Would you like to watch the series anyway, while we continue looking?" In some embodiments the user may be provided with the opportunity to record or acquire the remaining missed episodes from VOD, PPV, DVD, the Internet or any other manner aside from a broadcast media source. This may be desirable if a user wants to expedite creating the series aggregation. In some embodiments the user may be provided a choice between continuing to create the series aggregation from a broadcast media source (without additional payment) or acquiring some or all of the remaining missed episodes from one or more of the other media sources provided above (which may require payment). In some embodiments the user could get periodic updates on when the remaining missed episodes may be available and whether they may be acquired from other media sources for a payment.

The media guidance application may organize all episodes of the series aggregation at step 106 shown in FIG. 1A, and any other time the user accesses an incomplete series aggregation, present the status of a series aggregation. The organization of all episodes of the series aggregation may involve both providing a display screen showing the series aggregation and/or gathering information and/or the episodes themselves from the recording device or devices where the episodes of the series aggregation are stored. Information used in organizing the series aggregation may be stored in a local or remote database or any other storage means. The information in one or more of these databases may be in any suitable data management format, environment, or application, for example, a relational database format, an object oriented database format, a data warehouse, a data directory, a knowledge management system, or any other suitable device, environment or application for storing and indexing related information. For purposes of illustration of the invention a data structure will be described to organize the information necessary for providing the series aggregation but any format, environment, or application may be utilized. Exemplary data structures for organizing episodes of a series aggregation will be described below, for example, in connection with FIGS. 2-4.

FIG. 2 shows one embodiment of series aggregation information that is organized into illustrative data structure 200. Although not shown, data structure 200 may include an identifier for the series aggregation that allows user equipment to recognize that the data structure contains series aggregation identifiers, thereby allowing the user equipment or other devices to correctly parse the data structure. It will be appreciated that multiple series aggregations may be created by the media guidance application and thus multiple instances of data structure 200 corresponding to each series aggregation may be needed.

Data structure 200 may include field 202 that may include all episodes of a series aggregation. Field 202 may include a list of episodes of the series aggregation and may identify each episode using episode identifiers. Field 202 may be populated with a list of episode identifiers in response to a user's indication of interest to create a series aggregation, as in step 102 of process 100 of FIG. 1. Episode identifiers for a series aggregation may be acquired from one or more of a service provider, data source, programming source, television distribution facility, or any other data provider, server, or media source (referred to herein collectively as the media sources). Episode identifiers will be discussed in further detail below in connection with FIGS. 3 and 4. Field 202 may be organized in the form of a linked list of episode identifiers, an array of episode identifiers, a table of episode identifiers, or any other organization scheme of episode identifiers. It will be appreciated that all fields in data structures of FIGS. 2-4 may be organized using any organization scheme. Field 204 may include all episodes recorded of the series aggregation. Field 206 may include all missed episodes of the series aggregation. Field 208 may include all missed episodes of the series aggregation that are available and/or scheduled for recording. Field 210 may include all missed episodes of the series aggregation that are unavailable.

The types of features that can be specified by the series aggregation information of data structure 200 may be more specific or less specific depending on the particular implementation. For example, data structure 200 may include a field of other episodes in a series that relate to a series aggregation. Looking back to "The Sopranos" example, if the series aggregation for the data structure is for season 1 of "The Sopranos", this field may include episode identifiers for episodes in seasons 2-4 (i.e., episodes not in the series aggregation). This may be desirable to a user to enable a user to have episodic information for seasons or other groups of episodes for which a user is not currently creating a series aggregation.

When data structure 200 is created or instantiated for a series aggregation, field 204 may be empty because the media guidance application may not yet be aware of any episode available to a user. Field 206 may include all episodes of the series aggregation because the media guidance application considers all episodes when data structure 200 is created as missed episodes at this point in the process (i.e., step 108 shown in FIG. 1B). Field 208 may also be empty because the media guidance application may not have scheduled any episodes for recording yet or identified any episodes as being available yet. Initially, like field 206, field 210 may include all episodes of the series aggregation because the media guidance application may not have queried yet media sources to see if episodes are available.

When episodes are identified as available to the user (i.e., previously recorded) at step 110 shown in FIG. 1B, episode identifiers (i.e., unique program IDs) for those episodes may be added to field 204. When an episode identifier is added to field 204, it may be removed from field 206 and 210 because the episode is no longer considered a missed episode or unavailable. In order to determine if an episode is available to a user the media guidance application may acquire episode identifiers for the episodes on the user's storage device (local or remote). The media guidance application may then compare the episode identifiers acquired from the user's storage device with those episode identifiers in field 206 to determine whether the episodes on the user's storage device are needed for the series aggregation. As will be described in further detail below, for example, in connection with the system description in FIGS. 14-19, episode identifiers may be stored with the episode on a user's storage device at the time of recording. The episode identifiers may be included in the program guide data for each episode or program and may be available for storage with the episode or in a separate storage location. In other embodiments, episode identifiers may be acquired from one or more of the media sources after the episode is stored on the user's storage device.

When episodes are identified as available for recording at step 112 shown in FIG. 1B, episode identifiers for those episodes may be added to field 208 shown in FIG. 2 and removed from field 210. At step 112 shown in FIG. 1B, episode identifiers may be acquired as part of program information data when querying when one or more of the media sources. The episode identifiers acquired as part of the program information data in step 112 may be stored as a separate field in data structure 200 shown in FIG. 2 or may be stored in a separate location in the user's storage device. Episodes may be identified as available for recording if an episode identifier from the program information data matches an episode identifier in field 210. It is in response to this determination or match that the episode identifier for the matched episode is added to field 208 and removed from field 210.

In some embodiments, field 208 may include two separate fields: (1) one field for those episodes that may be available for recording, but not scheduled for recording; and (2) one field for those episodes that may be available for recording and scheduled for recording. Episodes may be available for recording, but not scheduled for recording if the episode does not meet certain qualifications. For example, an episode may not be in a desired format (e.g., a user only wants to schedule high-definition programs to be included in the series aggregation and not standard-definition programs). In an embodiment where only one of the described fields is utilized in field 208, an episode may only be added to field 208 if it meets all qualifications. In an embodiment where two fields are utilized for field 208, the media guidance application may be able to inform the user of episodes that do not meet all the user or system-specified qualifications. This may be beneficial to a user because a user may choose to record an episode not meeting all of the user's qualifications in order to expedite completion of a series aggregation.

Another example of episodes available but not scheduled for recording may be episodes discussed above, such as premium episodes, like on-demand episodes, pay-per-view (PPV) episodes, DVD episodes, etc. An episode may also be available but not scheduled for recording if a scheduling conflict arises in recording programs. Conflict in scheduling series aggregation episodes and how these conflicts are resolved are discussed in greater detail below, e.g., in connection with FIG. 11.

When episodes are recorded at step 114, episode identifiers may first be added to field 208 to indicate they are scheduled for recording and then when they are recorded they may be added to field 204 and removed from field 206 and 208. When a determination is made as to whether a series aggregation is complete at decision block 116 shown in FIG. 1B, the media guidance application may compare the identifiers in fields 202 and 204 shown in FIG. 2 to determine if they are the same because this may indicate that all episodes of the series aggregation have been recorded. Alternatively, the media guidance application may determine if field 206 is empty because this may indicate that there are no missed episodes. When a determination is made that a series aggregation is complete at decision block 116 shown in FIG. 1B, the media guidance application may automatically create a DVD locally. For example, once the season of "The Sopranos" has been recorded locally, the media guidance application may automatically create one or more DVDs for long-term storage, with or without additional payment.

FIG. 3 shows an embodiment of information for a missed episode that is organized into illustrative data structure 300. Data structure 300 may be included as episode identifiers or entries in fields 206, 208, and 210 of data structure 200 of FIG. 2. Field 302 may include an episode identifier for a missed episode of the series aggregation that data structure 300 represents. Episode identifiers may be implemented in any number of ways, including: episode or program identification numbers that include either separately or together with the episode identifier a season identifier; identification by the name of the program, season number of the program, and episode number of the program; or any other implementation of identifying a specific episode of a series aggregation. The episode identifier in field 302 of data structure 300 allows user equipment to recognize that the data structure contains episode identifiers, thereby allowing the user equipment or other devices to correctly parse the data structure.

Field 304 may include information regarding the date, time, and channel a missed episode may be available. The particular broadcast (i.e., by date, time and channel) referred to in field 304 may be the next available broadcast that meets the user- or media guidance application-specified qualifications. In some embodiments, an episode may be available on different dates, times, and channels so field 304 may include a list of entries for the missed episode. Including a list of entries for missed episodes in field 304 may be beneficial for the following reasons. In one example, if a scheduling conflict occurs, having multiple available times to record a program may be beneficial to resolve the conflict. In addition, some of the episodes that match the missed episode identifier may have different characteristics and may be more or less desirable depending on various media guidance application settings. For example, if an episode is available in multiple formats (e.g., high-definition and standard-definition), one of these formats may be more desirable to the user than the others.

In some embodiments there may be no entries in field 304 indicating that the missed episode is unavailable. In this situation, data structure 200 may be used as an identifier in fields 206 and 210. If there are entries in field 304 indicating that the missed episode is available, data structure 200 may be used as an identifier in fields 206 and 208. In some embodiments, field 304 may indicate if a program is available on-demand and thus the date and time aspects of this field may not be necessary. Additionally, field 304 may also indicate if a particular episode is available for purchase or free of charge.

Field 306 may indicate the one or media sources from which the missed episode is available. If there are multiple matches in field 304 for an episode, field 306 may include corresponding information for each entry in field 304. The media sources may include a broadcast provider, satellite provider, cable provider, VOD provider, PPV provider, DVD provider such as Netflix, Blockbuster or any other DVD provider, Internet provider, any server, or any other provider of media. Each entry in field 306 may include an identifier to the media source that can provide (through broadcast transmission, downloading, mail, etc.) the episode to the user. The identifier to the media source may include an identifier or other information that indicates where the episode is available at that media source to enable acquisition of the episode.

Field 308 may include format information for each entry in field 304. As mentioned above, episodes may be transmitted in standard-definition, high-definition, or in any other available format. Different formats of programming are discussed in greater detail below in connection with the system diagrams of FIGS. 14-19. Various other episode-specific information may also be included as a field in data structure 300. Entries in field 308 may correspond with those entries in field 304. Field 310 may include one or more users or the user equipment's history of a missed episode. For example, as discussed above, the media guidance application may monitor a viewer's viewing history to determine if a viewer has viewed or played an episode. As will be discussed below in greater detail in connection with FIG. 9, the media guidance application may receive an instruction from the user to not record episodes viewed or played previously with the series aggregation. In this embodiment, this episode may be constructively considered "recorded" and its episode identifier may be removed from field 206 and added to field 204 even though the episode may not actually be recorded. Other approaches for resolving this problem using the data structures may be implemented, but, generally speaking, this approach may enable the series aggregation to be completed in accordance with the user's settings (i.e., to not record episodes the user has already viewed or played).

The types of features that can be specified by the series aggregation information of data structure 300 may be more specific or less specific depending on the particular implementation.

FIG. 4 shows an embodiment of information for a recorded episode that is organized into illustrative data structure 400. Data structure 400 may be included as episode identifiers or entries in field 402 of data structure 400 of FIG. 4. Field 402 may include an episode identifier for a recorded episode of the series aggregation that data structure 400 represents. The episode identifier in field 402 of data structure 400 allows user equipment to recognize that the data structure contains episode identifiers, thereby allowing the user equipment or other devices to correctly parse the data structure. Field 404 may include information regarding the media source in which the episode of the series aggregation is stored. For example, the episode may be stored on a storage device on a home network, on a local server, on a remote server, or any other storage device. Storage of episodes will be discussed in greater detail below in connection with FIGS. 14-19. The information about where the episode is stored on the media source may include an identifier or other information that indicates where the episode is available at that media source. Fields 406 and 408 are similar to fields 308 and 310 of data structure 300 and their description applies equally to data structure 400.

As described above at step 116 of process 100 of FIG. 1, for example, the media guidance application can inform a user that a series aggregation is complete. Further details regarding the use of data structures 200, 300, and 400 in accessing a series aggregation when it is complete are discussed in further detail below in connection with FIG. 10. The types of features that can be specified by the series aggregation information of data structure 400 may be more specific or less specific depending on the particular implementation.

Figure 5:
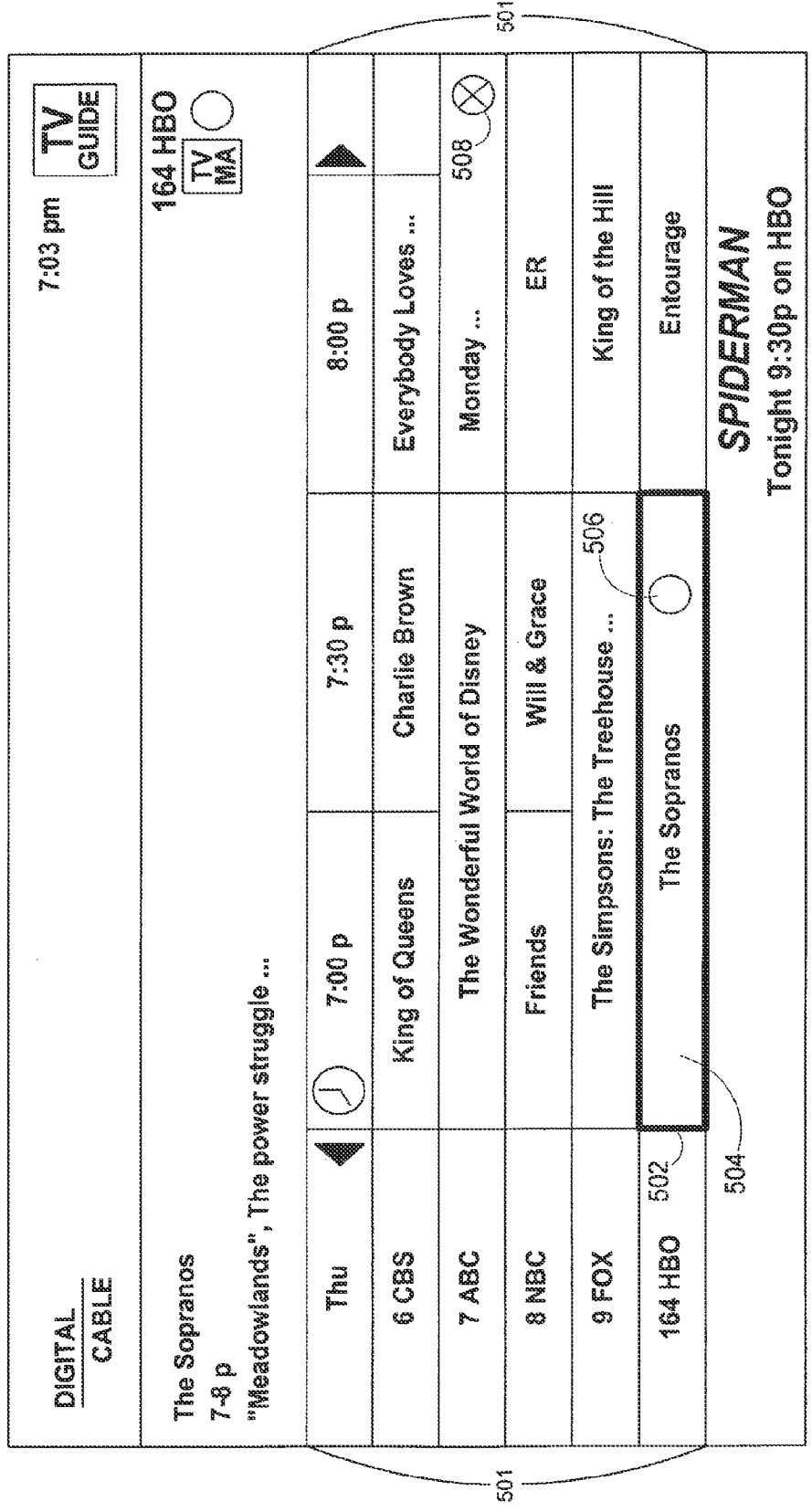
FIG. 5 shows an illustrative program listings display screen in accordance with one embodiment of the present invention.

FIGS. 5-13 show illustrative display screens that may be used to implement the systems and methods of the present invention. Some of these illustrative display screens (e.g., FIGS. 5-11) provide a user with an opportunity to create a series aggregation. FIG. 5 shows illustrative program listings display screen 500 that displays program listings. Various solutions for displaying program listings are found in Ellis, U.S. patent application Ser. No. 09/157,256, filed Sep. 17, 1998, which is hereby incorporated by reference herein in its entirety. Display screen 500 provides grid guide 501 providing program listings from various sources.

Display screen 500 includes program listings organized by channel, time, or any other suitable category. Display screen 500 includes program listing 504 as an exemplary program listing. Program listing 504 includes scheduled aggregation icon 506 to indicate that an episode that is identified in that listing is scheduled to be recorded as part of a series aggregation. Scheduled aggregation icon 506 may be displayed for a particular episode, for example, when a user has selected that episode to be included as part of a series aggregation at step 102 shown in FIG. 1. A program listing may include a canceled aggregation priority icon 508 to indicate that the episode that was scheduled to be part of a series aggregation may not be recorded due to a conflict that the media guidance application resolved by canceling the scheduled recording based on aggregation priorities. Various icons may be included as part of display screen 500 to indicate an episode's status as part of a series aggregation by accessing program guide information and/or the data structures of, e.g., FIGS. 2-4. Aggregation priorities are discussed in more detail below, e.g., in connection with FIG. 11.

Figure 6:
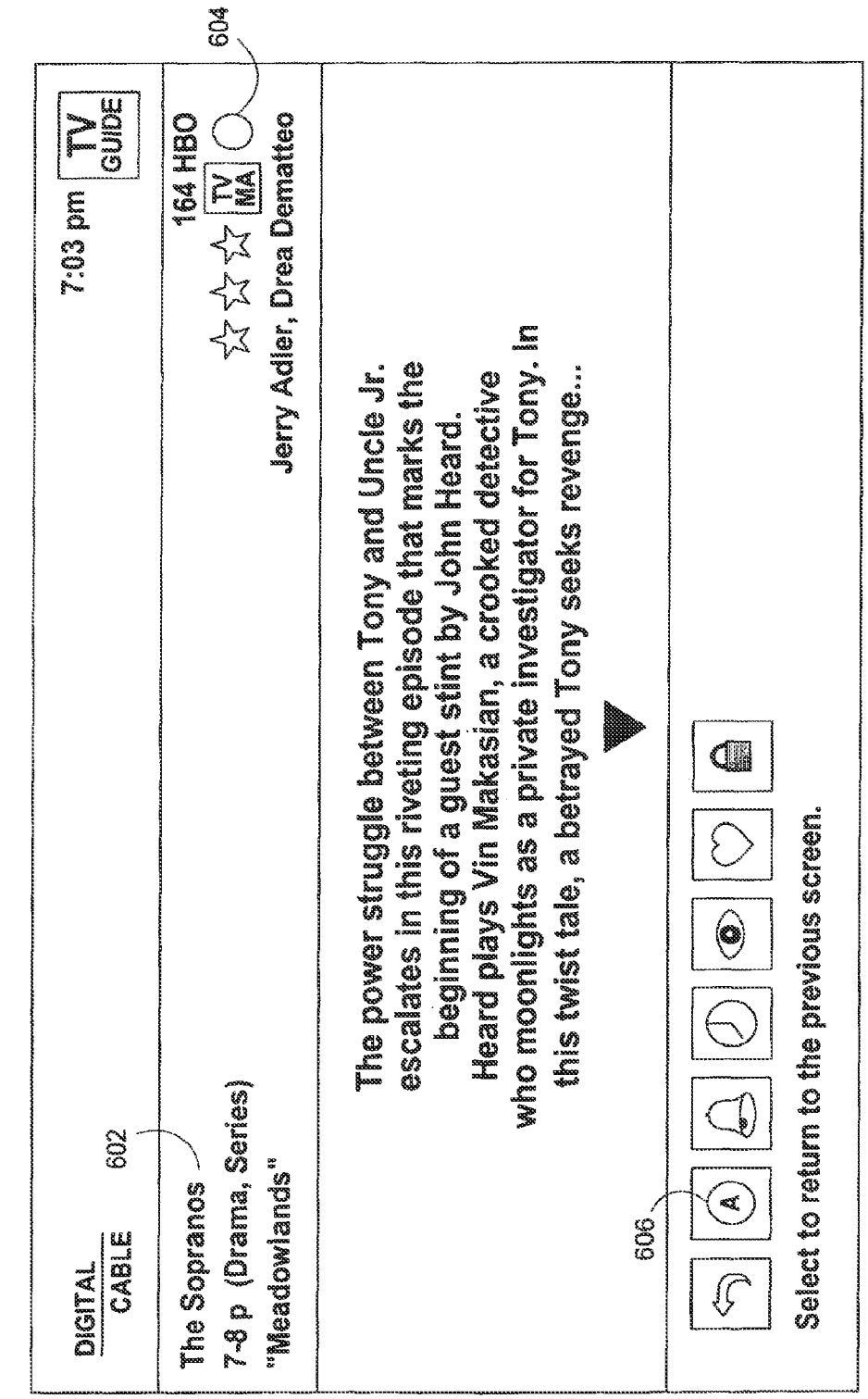
FIG. 6 shows an illustrative program information display screen for a program that a user selected to be recorded in accordance with one embodiment of the present invention.

In response to a user selection of a remote control INFO button when highlight window 502 is over program listing 504, a media guidance application may display an information display screen such as information display screen 600 shown in FIG. 6. Information display screen 600 may also be displayed in response to a user selection of a remote control INFO button while the user is watching a program, from any other display screen, or at any other time. Information display screen 600 includes title display 602 and may include program video (not shown) for a program that is currently airing on a tuned channel. Information display screen 600 also includes scheduled to be aggregated icon 604 that indicates that the episode is part of a series aggregation. Scheduled to be aggregated icon 604 may be displayed as a result of step 108 shown in FIG. 1B and may be similar to icon 506 of FIG. 5.

The media guidance application may provide a user with related program guide options in information display screen 600. Related program guide options may include aggregate series option 606, remind option, lock option, other air times option, and other suitable program guide options. Examples of some of these and other options are illustratively shown in Rudnick et al., U.S. patent application Ser. No. 09/356,268, filed Jul. 16, 1999, and Ellis et al., U.S. patent application Ser. No. 10/105,128, filed Feb. 21, 2002, which are hereby incorporated by reference herein in their entirety.

At step 102 shown in FIG. 1A, the media guidance application may receive a user's indication of interest to create a series aggregation of selected episodes of a series by selecting "Aggregate" option 606. The media guidance application may also receive a user's instruction to record missed episodes of a program series by selecting an "Aggregate" button on a user interface (e.g., remote control), described in more detail below, e.g., in connection with FIGS. 17-19. In response to the user selecting an "Aggregate" button on a user interface, the media guidance application may display a series aggregation setup display screen such as series aggregation setup display screen 700 shown in FIG. 7.

Figure 7:
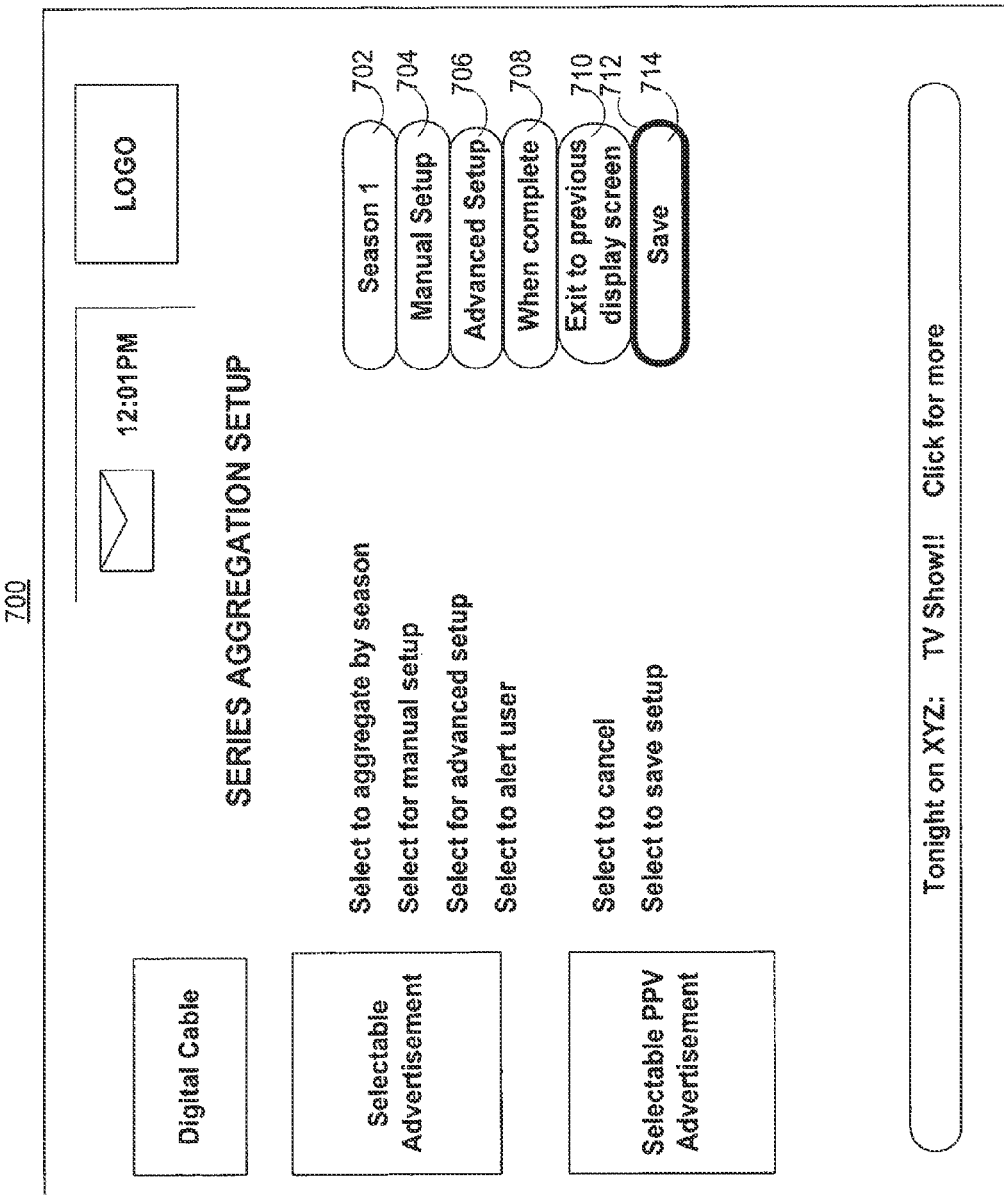
FIG. 7 shows an illustrative series aggregation setup display screen in accordance with one embodiment of the present invention.

FIG. 7 includes options that provide the user with the ability to set or to modify settings for series aggregations. For example, advanced setup option 702, season setup option 704, manual setup option 706, alert user option 708, cancel option 710, and save setup option 714 may be provided in display screen 700. Other options may be shown if desired. In some embodiments the options in display screen 700 may be displayed as an overlay over the screen from which the user selected to create the series aggregation (e.g., while watching a TV program, from a grid guide, a search results display screen, etc.).

A user may move highlight window 712 over any of these options and press a remote control OK button to select the option. For example, in response to a user selection of season setup option 702, the media guidance application may allow the user to select which season or seasons should be included in a series aggregation (see step 102 of FIG. 1). The season or seasons selected may identify the episodes of the selected series to be included in the series aggregation as shown, for example, in step 108 of FIG. 1B.

A user may also select to search for an episode. For example, the media guidance application may allow the user to select to search descriptions, reviews or any other information using a keyword or keywords. The media guidance application may also make available collateral material about a series or episode that the user is searching for. The user may also select to search for episodes or series that might be of interest. For example, the media guidance application may, in response to a user selection to set up a series aggregation for a season of "Seinfeld", display a display screen which may inform the user, "If you like Seinfeld, you may also like Curb Your Enthusiasm."

In response to a user selection of manual setup option 704, the media guidance application may display a manual setup display screen which may allow a user to select manually which episodes to be included in a series aggregation (see step 102 of FIG. 1). An illustrative manual setup display screen will be discussed in further detail below, e.g., in connection with FIG. 8. The episodes selected may also identify the episodes of the selected series to be included in the series aggregation as shown, for example, in step 108 of FIG. 1B.

In response to a user selection of advanced setup option 702, the media guidance application may display an advanced series aggregation setup display screen, which will be discussed in further detail below, e.g., in connection with FIG. 9. In response to a user selection of alert user option 708, the media guidance application may allow a user to select when to be alerted by the media guidance application with respect to the progress of completing the series aggregation. For example, the user may select to be alerted when the series aggregation is complete (e.g., all episodes within a series aggregation have been recorded), when a user-selected number of episodes in the sequence of episodes have been recorded where the sequence of episodes recorded enables a user to begin accessing the series aggregation (e.g., the first three episodes of the series aggregation, the first six episodes of the series aggregation, the seventh through twelfth episodes where the users viewing history indicates that the user has previously viewed episodes 1-6, etc.), or at any other suitable time. Various alert options and display screens will be discussed in further detail below in connection with FIGS. 12A-12B. In some embodiments presenting episodes of the series aggregation as in step 106 shown in FIG. 1A may allow the user to view the series aggregation.

In response to a user selection of save setup option 714, the media guidance application may save the settings that the user selected for the series aggregation. Using a series aggregation may invoke process 100 from FIG. 1 and the creation of data structure 200 and other necessary information, for example, data structures 200 and 300 saving the settings may also involve saving the series aggregation that the user selected (including the associated data structure 200) as part of the user's profile information. This may be useful in a multi-user environment, for example, if a user's profile information is used in connection with advanced series aggregation options discussed further below, e.g., in connection with FIG. 10. Finally, in response to a user selection of cancel option 710, a media guidance application may exit to the previously displayed display screen, such as information display screen 600 shown in FIG. 6 without creating a series aggregation.

It will be appreciated that the options provided in display screen 700 are merely illustrative and one or more options may be added or removed. For example, all of the advanced options from FIG. 9 may be included in display screen 700. In addition, one or more or all options may be removed such that certain options may be selected by default. For example, in one embodiment, option 702 may be the only option provided in display screen 700 (which may appear simply as an overlay) and may allow the user to select one of the pre-determined groupings of episodes (e.g., a particular season). In another embodiment, no options may be included and the media guidance application may determine which season (or other desired grouping of episodes) is associated with the selected program and create the series aggregation based on the default grouping. Default options may be set for creating a series aggregation and may include any one or more of the options provided in FIGS. 7 and 9.

Figure 8:
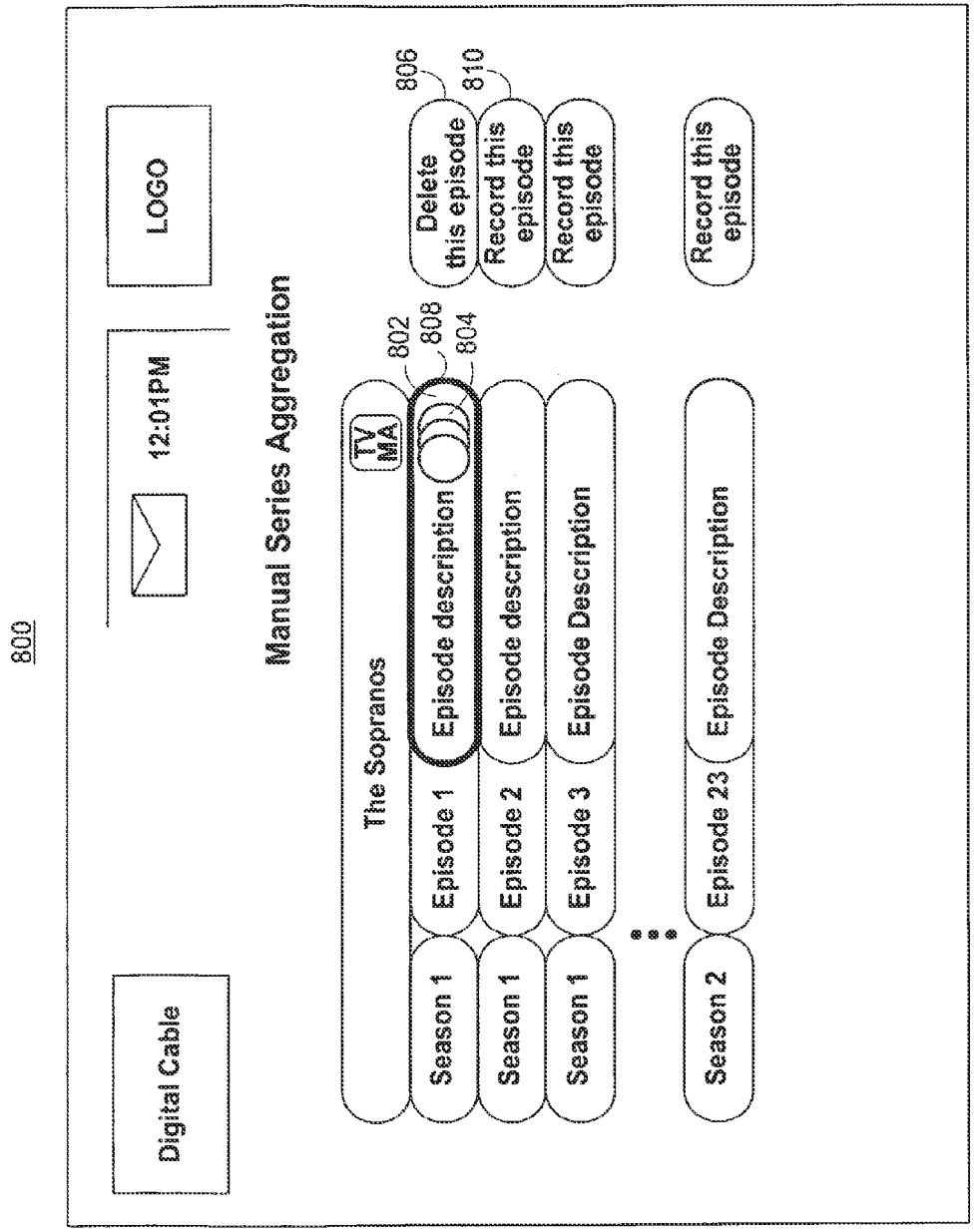
FIG. 8 shows an illustrative manual series aggregation setup display screen in accordance with one embodiment of the present invention.

In response to a user selection of manual setup option 706 shown in FIG. 7, the media guidance application may display a manual series aggregation setup display screen such as manual series aggregation setup display screen 800 shown in FIG. 8. FIG. 8 includes episode listings such as listing 802. Listing 802 includes icon 804 to indicate that a particular episode may have already been recorded as part of the series aggregation, or as part of a one-time recording that may be selected to be included as part of the series aggregation.

Manual series aggregation display screen 800 also includes delete this episode option 806 that may provide a user with the ability to delete the episode from memory or storage devices that may be provided for storage. The media guidance application may provide the user with the ability to move highlight window 808 over delete this episode option 806 to select to delete the particular listed episode that is associated with the delete this episode option 806. Option 810 may be included adjacent to a listing that may provide a user with the ability to record the episode as part of the series aggregation. Through display screen 800, the media guidance application may receive a user instruction to select particular episodes of one or more seasons of a series to be recorded as part of a series aggregation or to be included as part of a series aggregation if the episode is already recorded.

Figure 9:
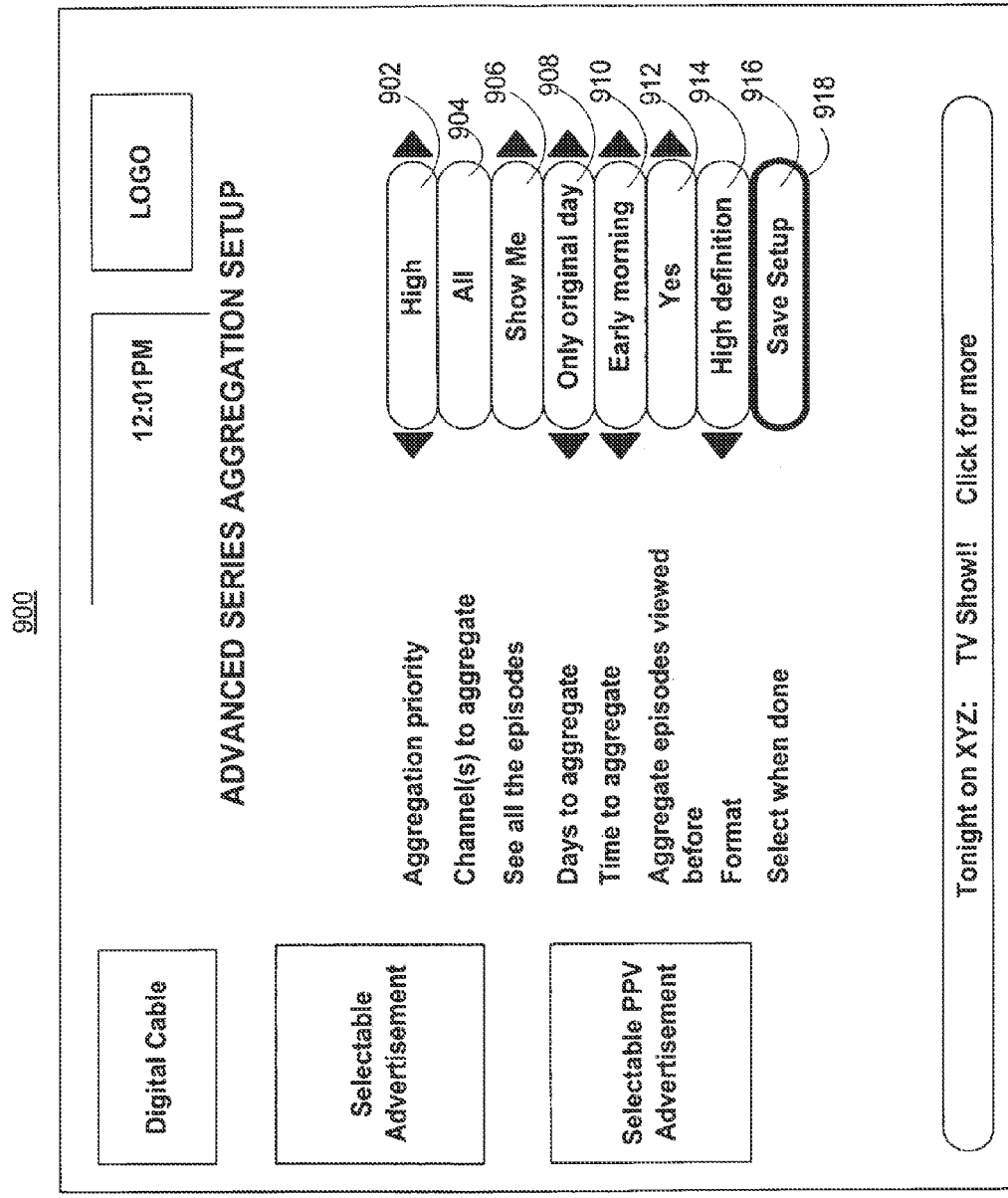
FIG. 9 shows an illustrative advanced series aggregation setup display screen in accordance with one embodiment of the present invention.

In response to a user selection of advanced setup option 704 shown in FIG. 7, the media guidance application may display an advanced series aggregation setup display screen such as advanced series aggregation setup display screen 900 shown in FIG. 9. FIG. 9 includes advanced series aggregation options that provide the user with the ability to set or to modify settings for series aggregations. For example, aggregation priority option 902, channels to aggregate option 904, see all episodes option 906, days to aggregate option 908, time to aggregate option 910, aggregate episodes viewed before option 912, format option 914, and save setup option 916 may be provided. Other options may be shown if desired.

Advanced series aggregation setup display screen 900 includes aggregation priority option 902 for a user to set the aggregation priority for a series aggregation. Aggregation priority may be set to high priority, medium priority, low priority, or any other suitable priority. In another embodiment, a media guidance application may provide a user with the ability to move highlight window 918 over aggregation priority option 902 and to press a remote control "OK" button. The media guidance application may then provide the user with a series aggregation priority order display screen. An illustrative series aggregation priority order display screen will be discussed further in detail below, e.g., in connection with FIG. 11. Essentially, aggregation priority may allow the media guidance application to prioritize recordings of episodes as compared between different series aggregations, among episodes of a series aggregation, as compared to other recordings set-up (regular series recording, one-time recording, etc.), or many other prioritization.

Advanced series aggregation setup display screen 900 shown in FIG. 9 includes channels to aggregate option 904 for a user to set to record series aggregations from "free" channels, premium channels, on-demand channels, "pay-per-view" channels, or any other combination of channels. The series aggregation channel selections may also include, for example, the original channel for the program that was used to set the series aggregation, all possible channels, a user-selected selection of channels, a specific type of channel, such as broadcast or premium channel, or any other suitable selection of channels.

Advanced series aggregation setup display screen 900 includes see all episodes option 906 for a user to see a list of all episodes in a series aggregation. In response to a user selection of see all episodes option 906, the media guidance application may display a series aggregation list display screen that lists all episodes that the user has selected to be included in a series aggregation. The list of all episodes can include episodes from all available media sources. An illustrative series aggregation list display screen will be discussed further, e.g., in connection with FIG. 10.

Advanced series aggregation setup display screen 900 shown in FIG. 9 includes days to aggregate option 908 for a user to set to record series aggregations only on specific days. A user may select a specific day, all days, or any other suitable combination of days.

Advanced series aggregation setup display screen 900 includes time to aggregate option 910 for a user to set to record series aggregations only at specific times. The user may select to record the episodes during prime time, late night, early morning, daytime, same time of day as the selected episode, or any other time or combination of times. By default if the user does not select a time, the media guidance application may choose to record only episodes that air at times of day that a user does not typically watch television.

Advanced series aggregation setup display screen 900 includes aggregate episodes viewed before option 912 for a user to set to record or not to record episodes that have been viewed before. The media guidance application may maintain a history of all episodes viewed by a particular user to make this determination. This determination may be part of the instructions received from the user to create a series aggregation of a selected series at step 102 shown in FIG. 1. This is discussed in greater detail above in connection with FIGS. 1, 3, and 4.

Advanced series aggregation setup display screen 900 includes format option 914 for a user to set to record standard definition, high definition, or any other format for episodes of a series aggregation.

Finally, advanced series aggregation setup display screen 900 includes save setup option 916 for a user to save the settings that the user selects in advanced series aggregation setup display screen 900.

Figure 10:
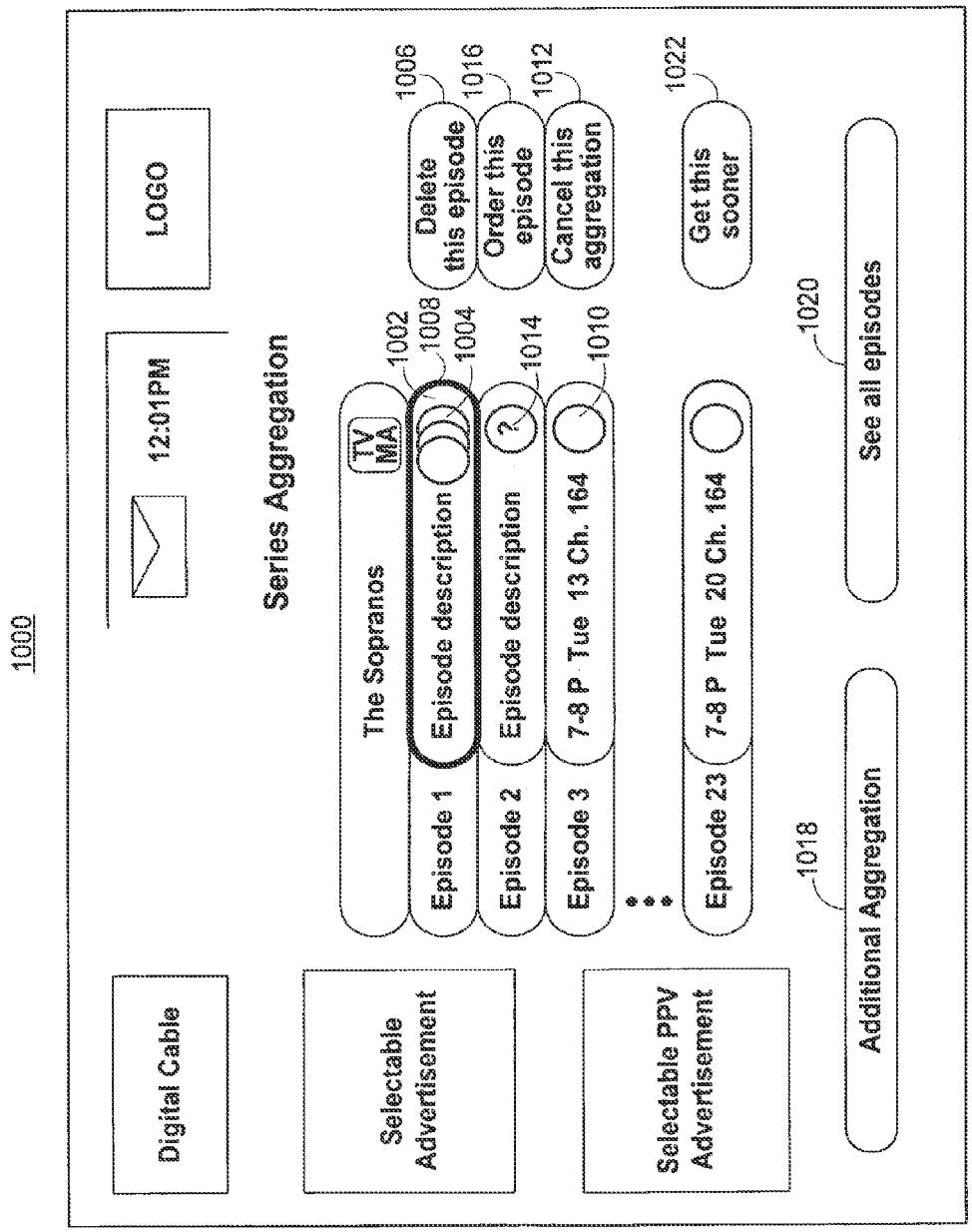
FIG. 10 shows an illustrative series aggregation list display screen in accordance with one embodiment of the present invention.

As stated above, advanced series aggregation setup display screen 900 includes see all episodes option 906 for a user to see a list of all episodes in a series aggregation. In response to a selection of see all episodes option 906, the media guidance application may display a series aggregation list display screen such as series aggregation list display screen 1000 shown in FIG. 10. The media guidance application may display series aggregation list display screen 1000 on a platform that is different from the main television platform or other device where the aggregation occurs. For example, the media guidance application may display series aggregation list display screen 1000 on an Internet browser, cellular telephone or any other suitable device where the user may set up and schedule different series aggregations. The media guidance application may also create the aggregation on any suitable device. Finally, the media guidance application may display the series aggregation on any suitable device. With reference now to FIG. 10, series aggregation list display screen 1000 may list all episodes that are in the series aggregation, and may include episodes that have not been scheduled to be recorded, episodes that have been recorded, or episodes that have been scheduled to be recorded. Series aggregation list display screen 1000 includes episode listings such as listing 1002 that may include episode descriptions and any other information for episodes in a series aggregation.

In order to provide access to a series aggregation, the media guidance application may access data structure 200 from FIG. 2. Data structure 200 provides the three categories of episodes described above for episodes that are included in a series aggregation: episodes recorded (i.e., field 202 of FIG. 2 and icon 1004 of FIG. 10); episodes that are scheduled for recording (i.e., field 208 of FIG. 2 and icon 1010 of FIG. 10); and episodes that are unavailable for recording (i.e., field 210 of FIG. 2 and icon 1014 of FIG. 10). When providing display screen 1000 of FIG. 10, the media guidance application may reference data structure 200 of FIG. 2 to provide information necessary to access the series aggregation.

Icon 1004 may be included in a listing to indicate that a particular episode may have already been recorded as part of the series aggregation or was already recorded by the user upon selecting to create the series aggregation. Regardless, each episode that has icon 1004 and as part of its listing 1002 may be included in field 204 of data structure 200 in indicating it is stored as part of the series aggregation. Series aggregation list display screen 1000 may also include delete this episode option 1006 that may provide a user with the ability to delete the episode from memory or storage devices. The media guidance application may provide the user with the ability to move highlight window 1008 over the delete this episode option 1006 to select to delete the particular listed episode that is associated with the delete this episode option 1006.

Icon 1010 may be included in a listing to indicate that a particular episode may be scheduled to be recorded as part of the series aggregation. Icon 1010 may be similar to icon 506 and 604 or FIGS. 5 and 6, respectively, and may be related to field 208 or data structure 200 of FIG. 2. Series aggregation list display screen 1000 may also include cancel this aggregation option 1012 that may provide a user with the ability to cancel the recording of the episode as part of the series aggregation for an episode that is associated with option 1012.

Icon 1014 may be included in a listing to indicate that a particular episode may not be scheduled to be recorded as part of the series aggregation because, for example, the episode is not scheduled to be available in the foreseeable future from a broadcast media source. Series aggregation list display screen 1000 may also include order this episode option 1016 that may provide a user with the ability to order the episode on-demand, on a DVD, on pay-per-view, or in any other suitable way. For example, if an episode is not scheduled to be available in the foreseeable future, the media guidance application may provide the user with the opportunity to select to order the episode on-demand, on a DVD, on pay-per-view, or in any other suitable way to avoid waiting for the episode to be available from a broadcast media source. These options may be provided in display screen 1000 or in a separate display screen. In some embodiments some episodes may only be available from a broadcast media source. In this embodiment, order this option 1016 may not be provided because it is only available for free from the broadcast media source. In some embodiments, the media guidance application may provide a user with information that a particular episode will be available for free in a certain number of days, so that the user may decide if he or she wants to pay money to get it sooner. In this embodiment, get this sooner option 1022 may be provided. To make the determination of whether the episode may be available sooner for an additional payment, the media guidance application may need to search a remote database. In response to selecting get this sooner option 1022, the media guidance application may provide the user with a series aggregation options display screen discussed further in detail below, e.g., in connection with FIG. 13.

A user may also select an individual listing 1002 to see a program information screen 600 shown in FIG. 6 for that episode. The individual episode may be deleted from the memory or storage devices that may be provided as storage from information screen 600 shown in FIG. 6. The media guidance application may also display additional information on information screen 600 about the highlighted episode or about all episodes on series aggregation list display screen 1000 shown in FIG. 10. The information may include a series episode title, an episodic description, guest actors or any other information of interest. The information may be found as a field in data structures, such as data structure 300 and 400.

Additional aggregation option 1018 may be included in series aggregation list display screen 1000. A user may select additional aggregation options 1018 to set up additional series aggregations that may be related to the series aggregation listed in display screen 1000. For example, if the series aggregation listed in display screen 1000 is the first season of "The Sopranos", a user selection of additional aggregation option 1018 may allow the user to select to create a series aggregation of the second season of "The Sopranos", a program related to "The Sopranos" such as "Joey" in which the same actor from "The Sopranos" stars, or any other related program. As described above, this information of related groups of episodes to the selected series aggregation may be included as a field of data structure 200.

See all episodes option 1020 may also be included in series aggregation list display screen 1000. A user may select the see all episodes option 1020 to see a list of all the episodes in the series that may be selected to be included as part of a series aggregation. For example, if the series aggregation listed in display screen 1000 is the first season of "The Sopranos", a user selection of see all episodes option 1020 may allow the user to see a list of all the episodes of "The Sopranos".

Figure 11:
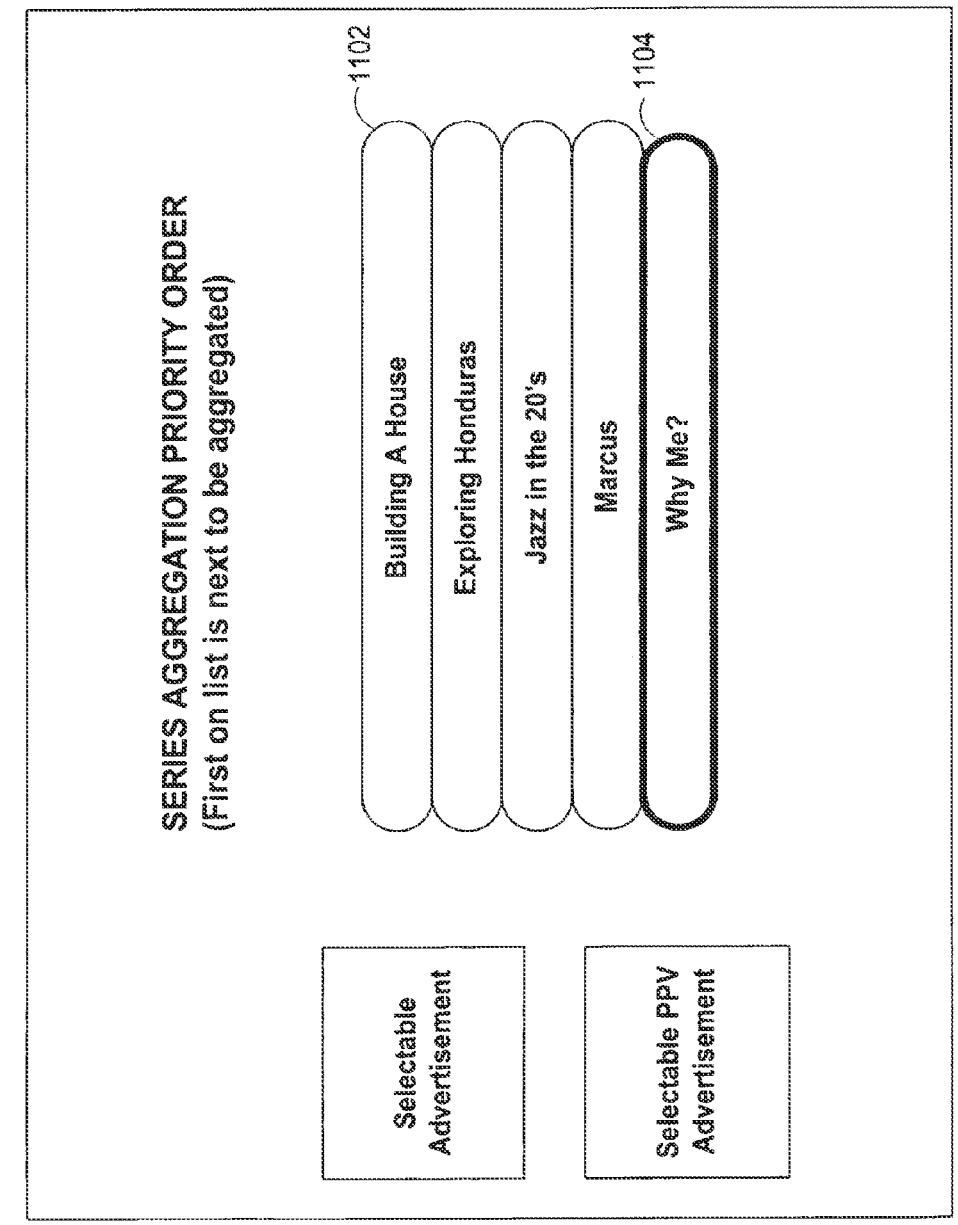
FIG. 11 shows an illustrative priority display screen in accordance with one embodiment of the present invention.

In response to selecting aggregation priority option 902, the media guidance application may provide the user with a series aggregation priority order display screen such as series aggregation priority order display screen 1100 shown in FIG. 11.

With reference now to FIG. 11, series aggregation priority order display screen 1100 displays series aggregation listings for series aggregations, such as listing 1102. Listings may be displayed in the priority order that series aggregations in one series are given over series aggregations in another series. One listing may be displayed for each scheduled series aggregation. The media guidance application may allow the user to move highlight window 1104 over a listing and to use remote control navigation buttons to move the listing up or down. The priority order in display screen 1100 may be used by the media guidance application to determine the priority of individual series aggregations with respect to all aggregations.

An embodiment relating to priority of individual episodes with respect to episodes within the same series aggregation may be provided. For example, a user may desire to record the episodes that were originally broadcast earlier in the series before the episodes that were originally broadcast later in the series. For example, it may be desirable to record episode 4.2 before episode 4.10 if a conflict exists because it may be necessary to view episode 4.2 before episode 4.10. This embodiment would also present the series aggregation sooner while still presenting the episodes in the order that they were originally presented.

FIGS. 12A and 12B show illustrative alerts for series aggregation display screens 1200 and 1202. Display screens 1200 and 1202 can be delivered to any device, such as a telephone, e-mail, SMS or any other suitable device. Display screen 1200 may provide an alert indicating that a series aggregation is complete. Display screen 1200 may provide the user with options regarding viewing the series aggregation in a display screen, such as in a display screen similar to display screen 1000 of FIG. 10. As indicated in display screen 1200, the alert may appear as an overlay of a grid guide. This is merely provided for illustration and alerts may appear in some other display screen or manner including, for example, over television programming, in a login screen in response to logging into the media guidance application, in a welcome display screen in response to turning on television or other user equipment, etc.

Display screen 1202 of FIG. 12B may provide an alert indicating that a series aggregation is incomplete. The alert in display screen 1202 may be provided in similar display screens like the alert in display screen 1200. The alert for an incomplete series aggregation may appear in display screen 1202 when a specified sequence of episodes of a series aggregation has been recorded (e.g. episodes 5.1-5.3—i.e., one beginning episode of a series aggregation). Further details and embodiments are discussed hereinabove, for example, in connection with step 116 of FIG. 1. Display screen 1202 may provide the user with options regarding viewing the series aggregation in a display screen, such as in a display screen similar to display screen 1000 of FIG. 10.

In response to selecting get this sooner option 1022, the media guidance application may provide the user with a series aggregation options display screen such as series aggregation options display screen 1300 shown in FIG. 13. Display screen 1300 shows an illustrative display screen for providing various options to view episodes of a series that have already been broadcast. Display screen 1300 provides several options from which a user may select to view episodes of a series. Display screen 1300 may also include a program listing including information on channel, time, actors, or any other suitable information.

Display screen 1300 includes access episodes of a series on-demand option 1304. A user may select this option to indicate a desire to access episodes of the series on-demand, for example, from a video-on-demand server. In response to selecting this option, the media guidance application may display a display screen that may include episodes of the series that may be accessed on-demand.

Display screen 1300 includes receive episodes of a series on a DVD option 1306. A user may select this option to indicate a desire to receive a DVD with episodes of the series. In response to a user selection of this option, the media guidance application may send a DVD to the user with episodes of the series. The user's address may be acquired from the user profile information. The user may then be able to view the episodes of the series.

Display screen 1300 includes purchase episodes of a series option 1308. A user may select this option to indicate a desire to purchase episodes of a series, for example, on pay-per-view through a pay-per-view provider. In response to a user selection of this option, the media guidance application may provide the user with various payment options, or may collect payment using user profile information. The user may then be able to view the episodes of the series. Options 1304 and 1306 may or may not require payment.

Display screen 1300 includes download episodes of a series option 1310. A user may select this option to indicate a desire to download episodes of a series, for example, to user equipment device from the Internet. In response to selecting option 1310, the media guidance application may download episodes of the series to user equipment device from the Internet.

Display screen 1300 includes create series aggregation option 1312. In response to selecting option 1312, the media guidance application may display series aggregation setup display screen 700 shown in FIG. 7 to create a series aggregation. Creating a series aggregation may then follow the process as set forth in process 100 of FIG. 1. After completing the process 100, the user may then be able to view the episodes of the series.

Figure 14:
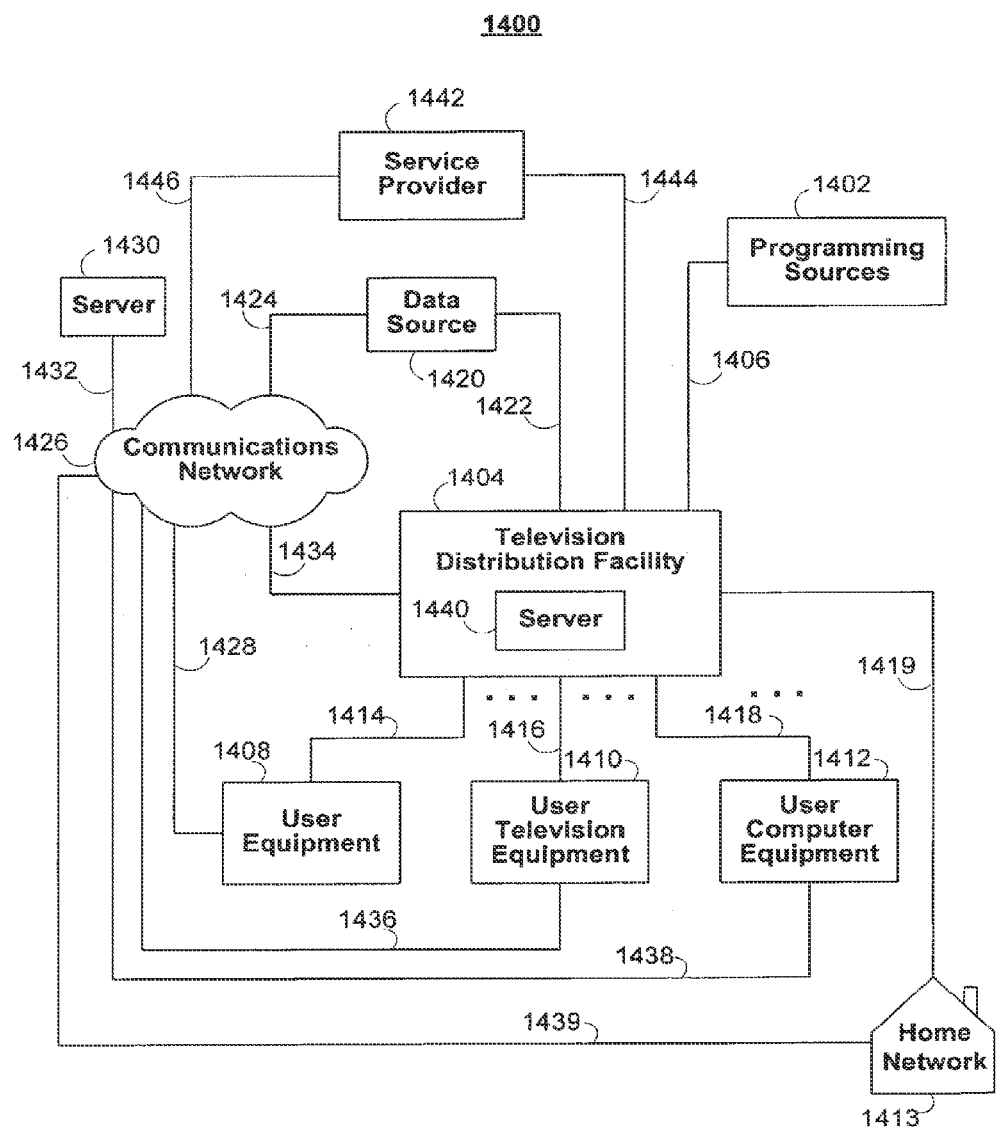
FIG. 14 is a diagram of an illustrative interactive media guidance system in accordance with the present invention.

An illustrative interactive media guidance system 1400 in accordance with the present invention is shown in FIG. 14. System 1400 is intended to illustrate a number of approaches by which media of various types, and guidance for such media, may be provided to (and accessed by) end-users. The present invention, however, may be applied in systems employing any one or a subset of these approaches, or in systems employing other approaches for delivering media and providing media guidance.

The first approach represents a typical television-centric system in which users may access television (and in some systems music) programming. This is the approach described herein, but other approaches may be contemplated by the present invention. The television-centric approach includes programming sources 1402 and distribution facility 1404. Media such as television programming and digital music is provided from programming sources 1402 to distribution facility 1404, using communications path 1406. Communications path 1406 may be a satellite path, a fiber-optic path, a cable path, or any other suitable wired or wireless communications path or combination of such paths.

Programming sources 1402 (or media sources) may be any suitable sources of television and music programming, such as television broadcasters (e.g., NBC, ABC, and HBO) or other television or music production studios. Programming sources 1402 may provide television programming in a variety of formats in high definition and standard definition, such as, for example, 1080p, 1080i, 720p, 480p, 480i, and any other suitable format.

Distribution facility 1404 may be a cable system headend, a satellite television distribution facility, a television broadcaster, or any other suitable facility for distributing video media (e.g., television programs, video-on-demand programs, pay-per-view programs) and audio media (e.g., music programming and music clips) to the equipment of subscribers of the corresponding cable, satellite, Internet or IPTV system. In some approaches, distribution facility 1404 may also distribute series program episodes and other media to users, such as video and audio clips, web pages, and interactive applications, that may be offered to subscribers of a given cable, satellite, Internet or IPTV system. Distribution facility 1404 may be any of the one or more media sources described herein, such as VOD provider, broadcast provider, Internet provider, or any other media source. There are typically numerous television distribution facilities 1404 in system 1400, but only one is shown in FIG. 14 to avoid overcomplicating the drawing.

Distribution facility 1404 may be connected to various user equipment devices 1408, 1410, and 1412. Such user equipment devices may be located, for example, in the homes of users. User equipment devices may include user television equipment 1410, user computer equipment 1412, or any other type of user equipment suitable for accessing media. User equipment 1108 may be any type of user equipment (e.g., user television equipment, user computer equipment, cellular phones, handheld video players, gaming platforms, etc.) and, for simplicity, user equipment devices may be referred to generally as user equipment 1408.

User equipment devices 1408, 1410, and 1412 may receive media (such as television, music, web pages, etc.), series program episodes, and other data from distribution facility 1404 over communications paths, such as communications paths 1414, 1416, and 1418, respectively. User equipment devices 1408, 1410, and 1412 may also transmit signals to distribution facility 1404 over paths 1414, 1416, and 1418, respectively. Paths 1414, 1416, and 1418 may be cables or other wired connections, free-space connections (e.g., for broadcast or other wireless signals), satellite links, or any other suitable link or combination of links.

A second approach illustrated in FIG. 14 by which media and media guidance are provided to end users is a non-television-centric approach. In this approach media such as video (which may include television programming), audio, images, web pages, or a suitable combination thereof, are provided to equipment of a plurality of users (e.g., user equipment 1408, user television equipment 1410, and user computer equipment 1412) by server 1430 via communications network 1426. This approach is non-television-centric because media (e.g., television programming) is provided by and delivered at least partially, and sometimes exclusively, via equipment that have not traditionally been primarily focused on the television viewing experience. For example, episodes desired by a user to be in a series aggregation may be provided by the Internet. Non-television-centric equipment is playing a larger role in the television viewing experience.

In some embodiments for this approach, communications network 1426 is the Internet. Thus a missed episode desired by a user to be included in a series aggregation may be downloaded from the Internet. Server 1430 may provide for example a web site that is accessible to the user's equipment and provides an online guidance application for the user. In such approaches, the user's equipment may be, for example, a PC or a hand-held device such as a PDA or web-enabled cellular telephone that incorporates a web browser. In other embodiments, server 1430 uses the Internet as a transmission medium but does not use the Web. In such approaches, the user's equipment may run a client application that enables the user to access media. In still other approaches, communications network 1426 is a private communications network, such as a cellular phone network, that does not include the Internet.

In yet other approaches, communications network 1426 includes a private communications network and the Internet. For example, a cellular telephone or other mobile-device service provider may provide Internet access to its subscribers via a private communications network, or may provide media such as video clips or television programs to its subscribers via the Internet and its own network.

The aforementioned approaches for providing media may, in some embodiments, be combined. For example, a distribution facility 1404 may provide a television-centric media delivery system, while also providing users' equipment (e.g., 1408, 1410 and 1412) with access to other non-television-centric delivery systems provided by server 1430. For example, a user's equipment may include a web-enabled set-top box or a television enabled PC. Distribution facility 1404 may, in addition to television and music programming, provide the user with Internet access whereby the user may access server 1430 via communications network 1426. Distribution facility 1404 may communicate with communications network 1426 over any suitable path 1434, such as a wired path, a cable path, fiber-optic path, satellite path, or combination of such paths.

Media guidance applications may be provided using any approach suitable for the type of media and distribution system for which the applications are used. Media guidance applications may be, for example, stand-alone applications implemented on users' equipment. In other embodiments, media guidance applications may be client-server applications where only the client resides on the users' equipment. For example, media guidance applications may be implemented partially as a client application on control circuitry on a user's equipment (e.g., control circuitry 1902 of FIG. 19 discussed below), and partially on a remote server as a server application (e.g., server 1440 of FIG. 14 discussed below). The control circuitry may be configured to receive an indication of interest from a user to create a series aggregation of selected episodes of a series. The control circuitry may then transmit the indication to a remote server. The remote server may then collect episodes of the series, and organize the episodes in the order in which they were originally made available. The control circuitry may then receive from the remote server data indicating the collected and organized episodes.

In still other embodiments, guidance applications may be provided as web sites accessed by a browser implemented on the users' equipment. In such online embodiments, control circuitry may transmit the indication of interest as, for example, a POST command, and the data indicating the collected and organized episodes may be received in a web page. Whatever the chosen implementation, the guidance application will require information about the media for which it is providing guidance. For example, titles or names of media, brief descriptions, episode identifiers, or other information may be necessary to allow users to navigate among and find desired media selections.

In some television-centric embodiments, for example, the guidance application may be a stand-alone interactive television program guide that receives program guide data via a data feed (e.g., a continuous feed, trickle feed, or data in the vertical blanking interval of a channel). Data source 1420 in system 1400 may include a program listings database that is used to provide the user with television program-related information such as scheduled broadcast times, titles, channels, ratings information (e.g., parental ratings and critic's ratings), detailed title descriptions, genre or category information (e.g., sports, news, movies, etc.), program format (e.g., standard definition, high definition), episode identifiers (such as those used in data structures 300 and 400 of FIGS. 3 and 4, respectively), and information on actors and actresses. Data source 1420 may also be used to provide series program episodes, advertisements (e.g., program guide advertisements and advertisements for other interactive television applications), real-time data such as sports scores, stock quotes, news data, and weather data, application data for one or more media guidance applications or other interactive applications, and any other suitable data for use by system 1400 in display screens 500, 600, 700, 800, 900, 1000, 1100, 1200, 1300, or any other display screen. As another example, data source 1420 may provide data indicating the types of information that may be included in interactive media guidance overlays (e.g., at the request of the user, absent user modification, etc.). The interactive media guidance application may query one or more media sources to perform step 108 shown in FIG. 1 by querying data from data source 1420 shown in FIG. 14, programming sources 1402, servers or other equipment, such as server 1430, service providers such as service provider 1442, distribution facility 1404, a device in the home network 1413, user equipment 1408, 1410 or 1412, or any other suitable media source.

Program guide data, including episode identifiers (such as those of data structures 300 and 400 of FIGS. 3 and 4, respectively), may be provided to user equipment, including user equipment located on home network 1413, using any suitable approach. For example, program schedule data and other data may be provided to the user equipment on a television channel sideband, in the vertical blanking interval of a television channel, using an in-band digital signal, using an out-of-band digital signal, or by any other suitable data transmission technique. Program schedule data and other data may be provided to user equipment on multiple analog or digital television channels. Program schedule data and other data may be provided to the user equipment with any suitable frequency (e.g., continuously, daily, in response to a request from user equipment, etc.). The frequency by which data is provided may, if desired, be linked to the querying of media sources for information regarding missed episodes (see, e.g., steps 112 and 114 of FIG. 1B).

In some television-centric embodiments, guidance data from data source 1420 may be provided to users' equipment using a client-server approach. For example, a guidance application client residing on the user's equipment may initiate sessions with server 1440 to obtain guidance data when needed. In some embodiments, the guidance application may initiate sessions with server 1440 via a home network server (e.g., a server located in home network 1413 that supports the user equipment devices located in home network 1413).

There may be multiple data sources (such as data source 1420) in system 1400, although only one data source is shown in FIG. 14 to avoid overcomplicating the drawing. For example, a separate data source may be associated with each of a plurality of television broadcasters and may provide data that is specific to those broadcasters (e.g., advertisements for future programming of the broadcasters, logo data for displaying broadcasters' logos in program guide display screens, etc.). Data source 1420 and any other system components of FIG. 14 may be provided using equipment at one or more locations. Systems components are drawn as single boxes in FIG. 14 to avoid overcomplicating the drawings.

Data source 1420 may provide data including episode identifiers (such as those of data structures 300 and 400 of FIGS. 3 and 4) to distribution facility 1404 over communications path 1422 for distribution to the associated user equipment and home network 1413 (discussed below) over paths 1414, 1416, 1418, and 1419 (e.g., when data source 1420 is located at a main facility). Communications path 1422 may be any suitable communications path such as a satellite communications path or other wireless path, a fiber-optic or other wired communications path, a path that supports Internet communications, or other suitable path or combination of such paths.

In some television-centric and non-television centric approaches, data source 1420 may provide guidance data directly to user equipment 1408 over path 1424, communications network 1426, and path 1428 (e.g., when data source 1420 is located at a facility such as one of programming sources 1402). In some embodiments of the present invention, data source 1420 may provide guidance data directly to user equipment located on home network 1413 (discussed below) over path 1424, communications network 1426, and path 1439 (e.g., when data source 1420 is located at a facility such as one of programming sources 1402). Paths 1424, 1428, and 1439 may be wired paths such as telephone lines, cable paths, fiber-optic paths, satellite paths, wireless paths, any other suitable paths or a combination of such paths. Communications network 1426 may be any suitable communications network, such as the Internet, the public switched telephone network, or a packet-based network.

User equipment devices, including user equipment devices located on home network 1413 (discussed below), such as user television equipment and personal computers, may use the program schedule data and other interactive media guidance application data to display program listings and other information (e.g., information on series programs, digital music) for the user. An interactive television program guide application or other suitable interactive media guidance application may be used to display the information on the user's display (e.g., in one or more overlays that are displayed on top of video for a given television channel, such as display screens 500, 600, 700, 800, 900, 1000, 1100, 1200, 1300, or any other display screen). Interactive displays may be generated and displayed for the user using any suitable approach. In one suitable approach, distribution facility 1404, server 1430, or another facility, may generate application display screens and may transmit the display screens to user equipment for display. In another suitable approach, user equipment may store data for use in one or more interactive displays (e.g., program schedule data, advertisements, logos, series program episodes, etc.), and an interactive media guidance application implemented at least partially on the user equipment may generate the interactive displays based on instructions received from distribution facility 1404, server 1430 or another facility. In some embodiments of the present invention, user equipment may store only the data that is used to generate the interactive television displays (e.g., storing series program episode information, storing logo data for a particular television broadcaster only if the logo is to be included in one or more interactive television displays). In some embodiments of the present invention, user equipment may store data that is not necessarily used to generate the interactive television displays (e.g., storing advertisements associated with a particular television broadcaster that may or may not be displayed depending on, for example, the outcome of negotiations with the television broadcaster). Any other suitable approach or combination of approaches may be used to generate and display interactive overlays for the user, such as display screens 500, 600, 700, 800, 900, 1000, 1100, 1200, 1300, or any other display screen.

In still other embodiments, interactive media guidance applications (television-centric and non-television centric) may be provided online as, for example, websites. For example, server 1430 may provide an online interactive television program guide. As another example, user equipment 1408 may be a mobile device, such as a cellular telephone or personal digital assistant (PDA). The mobile device may be web-enabled to allow the user to access an online guidance application (which may be modified from its original version to make it appropriate for a cellular phone). Alternatively, the mobile device may have an applet that communicates with server 1430 to obtain guidance data via the Internet.

Server 1430 may receive program schedule data and other data (e.g., series program episode information) from data source 1420 via communications path 1424, communications network 1426, and communications path 1432 or via another suitable path or combination of paths. Path 1432 may be a satellite path, fiber-optic path, wired path, or any other path or combination of paths. User equipment 1408 may access the online interactive media guidance application and other sources from server 1430 via communications path 1428. User equipment 1408 may also access the application and other services on server 1430 via communications path 1414, distribution facility 1404, and communications path 1434. For example, a cable modem or other suitable equipment may be used by user equipment 1408 to communicate with distribution facility 1404.

User equipment such as user television equipment 1410, user computer equipment 1412, and user equipment located on home network 1413 may access the online interactive media guidance application and server 1430 using similar arrangements. Episodes to be included in a series aggregation may be accessed through such arrangements as well. User television equipment 1410 may access the online interactive media guidance application and server 1430 using communications path 1436 or using path 1416, distribution facility 1404, and path 1434. User computer equipment 1412 may access the online interactive media guidance application and server 1430 using communications path 1438 or using path 1418, distribution facility 1404, and path 1434. User equipment located on home network 1413 may access the online media guidance application and server 1430 using communications path 1439 or using path 1419, distribution facility 1404, and path 1434. Paths 1436, 1438, and 1439 may be any suitable paths such as wired paths, cable paths, fiber-optic paths, wireless paths, satellite paths, or a combination of such paths.

In some embodiments, system 1400 may support other interactive applications in addition to the interactive media guidance applications. Such applications may be implemented using any suitable approach. For example, the interactive applications may be implemented locally on the user equipment or in a distributed fashion (e.g., using a client-server architecture in which the user equipment serves at least partly, and for at least some of the time, as the client and a server, such as server 1440 at distribution facility 1404, server 1430, or other suitable equipment acts as the server). Other distributed architectures may also be used if desired. Moreover, some or all of the features of the interactive applications of system 1400 (including the media guidance application) may be provided using operating system software or middleware software. Such operating system software and middleware may be used instead of or in combination with application-level software. In yet other approaches, interactive applications may also be supported by servers or other suitable equipment at one or more service providers such as service provider 1442. Regardless of the particular arrangement used, the software that supports these features may be referred to as an application or applications.

For example, an interactive application such as a home shopping service may be supported by a service provider such as service provider 1442 that has sales representatives, order fulfillment facilities, account maintenance facilities, and other equipment for supporting interactive home shopping features. A home shopping application that is implemented using the user equipment may be used to access the service provider to provide such features to the user. The user equipment may access service provider 1442 via distribution facility 1404 and communications path 1444 or via communications network 1426 and communications path 1446. Communications paths such as paths 1444 and 1446 may be any suitable paths such as wired paths, cable paths, fiber-optic paths, satellite paths, or a combination of such paths.

Another example of an interactive application is a home banking application. A home banking service may be supported using personnel at facilities such as service provider 1442. An interactive home banking application that is implemented using the user equipment may access the home banking service via distribution facility 1404 and communications path 1444 or via communications network 1426 and communications path 1446.

If desired, an interactive media guidance application such as a network-based video recorder or a video-on-demand application may be supported using server 1440, server 1430, a home network server, or equipment at service provider 1442. Video-on-demand content and video recorded using a network-based video recorder arrangement may be stored on server 1440 or server 1430 or a home network server or at service provider 1442 and may be provided to the user equipment when requested by users. An interactive television program guide, for example, may be used to support the functions of a personal video recorder (sometimes called a digital video recorder) that is implemented using user equipment 1408. Illustrative equipment that may be used to support personal video recorder functions include specialized personal video recorder devices, integrated receiver decoders (IRDs), set-top boxes with integrated or external hard drives, or personal computers with video recording capabilities.

Interactive applications such as media guidance applications (e.g., interactive television program guide applications and video-on-demand applications), home shopping applications, home banking applications, game applications, and other applications (e.g., applications related to e-mail and chat or other communications functions, etc.) may be provided as separate applications that are accessed through a navigation shell application (i.e., a menu application with menu options corresponding to the applications). The features of such applications may be combined. For example, games, video-on-demand services, home shopping services, network-based video recorder functions, personal video recorder functions, navigational functions, program guide functions, communications functions, and other suitable functions may be provided using one application or any other suitable number of applications. The one or more applications may display various overlays on user equipment including, for example, interactive television information on top of video for a given television channel.

Interactive television program guide applications, home banking applications, home shopping applications, network-based video recorder and personal video recorder applications, video-on-demand applications, gaming applications, communications applications, and navigational applications are only a few illustrative examples of the types of interactive media guidance and other applications that may be supported by system 1400. Other suitable interactive applications that may be supported include news services, web browsing and other Internet services, and interactive wagering services (e.g., for wagering on horse races, sporting events, and the like). Interactive television overlays that are displayed by these applications may also be customized in accordance with the present invention.

Users may have multiple types of user equipment by which they access media and obtain media guidance. For example, some users may have home networks that are accessed by in-home and mobile devices. As shown in FIG. 14, home network 1413 communicates with distribution facility 1404 and server 1430 over paths 1419 and 1439 (and, in the case of server 1430, communications network 1426). Such home networks 1413 may be located, for example, in homes of users or distributed, for example, among homes of users. Home networks 1413 may each include a plurality of interconnected user equipment devices, such as, for example user equipment devices 1408, 1410 and 1412. In some embodiments, users may control in-home devices via a media guidance application implemented on a remote device. For example, users may access an online media guidance application on a website via a personal computer at their office, or a mobile device such as a PDA or web-enabled cellular telephone. The user may set settings (e.g., recordings, reminders, or other settings) on the online guidance application to control the user's in-home equipment. The online guide may control the user's equipment directly, or by communicating with a media guidance application on the user's in-home equipment.

Figure 15:
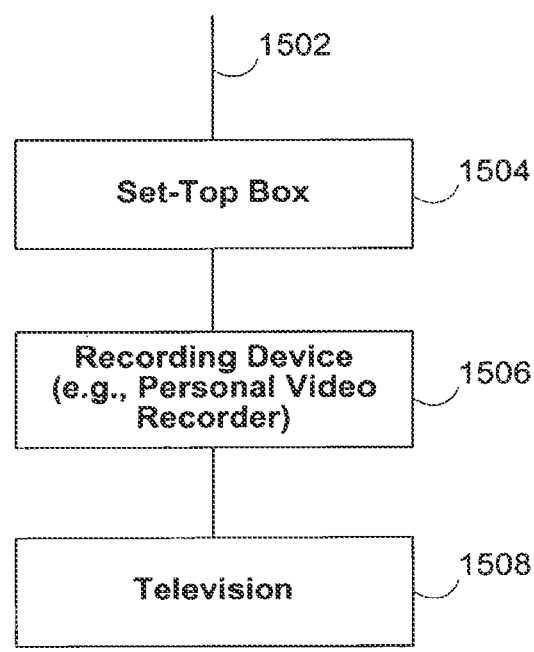
FIG. 15 is a diagram of illustrative user television equipment in accordance with the present invention.

FIGS. 15-19 show illustrative arrangements for user equipment. An illustrative set-top box-based arrangement for user equipment 1410 is shown in FIG. 15. User television equipment 1410 may be stand-alone or a part of home network 1413 (FIG. 14). User television equipment 1410 may include a recording device 1506 shown in FIG. 15 such as a digital video recorder (e.g., a personal video recorder (PVR)) that uses a hard disk or other storage for recording episodes. Recording device 1506 may alternatively be a digital video disc recorder, compact disc recorder, video recording device, video recorder, or other suitable recording device (not shown). Equipment 1410 may also include a television 1508. In some embodiments, such as when a user selects to create a series aggregation from high-definition channels, television 1208 may be HDTV-capable. Input/output 1502 may be connected to communications paths such as paths 1516 and 1536 (FIG. 15). Input/output functions may be provided by one or more wires or communications paths, but are shown as a single path in FIG. 15 to avoid overcomplicating the drawing. Television programming, program guide data, episode identifiers (such as those of data structures 300 and 400 of FIGS. 3 and 4), and any other suitable interactive media guidance application data or other data may be received using input/output 1502. Commands and requests and other data generated as a result of user interactions with the interactive media guidance application may also be transmitted over input/output 1502.

Set-top box 1504 may be any suitable analog or digital set-top box (e.g., a cable set-top box). Set-top box 1504 may contain an analog tuner for tuning to a desired analog television channel (e.g., a channel comprising television programming, interactive television data, or both, to display video for an analog television channel when a user selects to create a series aggregation from an analog television channel), and multiple other tuners may also be provided. Set-top box 1504 may also contain digital decoding circuitry for receiving digital television channels (e.g., channels comprising television or music programming, interactive television data, series program episode data, etc.). Set-top box 1504 may also contain a high-definition television tuner for receiving and processing high-definition television channels. Analog, digital, and high-definition channels may be handled together if desired. Multiple tuners may be provided (e.g., to handle simultaneous watch and record functions or picture-in-picture (PIP) functions). Box 1504 may be an integrated receiver decoder (IRD) that handles satellite television. If desired, box 1504 may have circuitry for handling cable, over-the-air broadcast, and satellite content.

Set-top box 1504 may be configured to output media, such as television programs, in a preferred format. Because television programs may be received in a variety of formats, set-top box 1504 may contain scaler circuitry for upconverting and downconverting television programs into the preferred output format used by set-top box 1504. For example, set-top box 1504 may be configured to output television programs in 720p. In this example, the scaler circuitry may upconvert standard-definition television programs having 480 lines of vertical resolution to 720p format and downconvert certain high-definition television programs having 1080 lines of vertical resolution to 720p format.

Box 1504 may include a storage device (e.g., a digital storage device such as a hard disk drive) for providing recording capabilities. Box 1504 may also be connected to a recording device 1506 such as a video recording device, personal video recorder, optical disc recorder, or other device or devices with storage capabilities. In some embodiments, box 1504 may be configured to record either standard-definition television programs or high-definition television programs. In some embodiments, box 1504 may be configured to record both standard-definition television programs and high-definition television programs.

Set-top box 1504 contains a processor (e.g., a microcontroller or microprocessor or the like) that is used to execute software applications. Set-top box 1504 may contain memory such as random-access memory for use when executing applications and/or recording episodes for a series aggregation. Nonvolatile memory may also be used (e.g., to launch a boot-up routine and other instructions). Hard disk storage in box 1504 or in recording device 1506 may be used to back up data and to otherwise support larger databases (e.g., program guide databases or other interactive television application databases) and storage requirements than may be supported using random-access memory approaches. Hard disk storage in box 1504 or in recording device 1506 may also be used to store and back up program guide settings or saved user preferences, such as user preferences that may be saved after a user selects (e.g. options shown in FIGS. 7 and 9), and to record episodes in a series aggregation.

Set-top box 1504 may have infrared (IR) or other communications circuitry for communicating with a remote control or wireless keyboard. Set-top box 1504 may also have dedicated buttons and a front-panel display. The front-panel display may, for example, be used to display the current channel to which the set-top box is tuned.

Set-top box 1504 may also have communications circuitry such as a cable modem, an integrated services digital network (ISDN) modem, a digital subscriber line (DSL) modem, a telephone modem, or a wireless modem for communications with other equipment. Such communications may involve the Internet or any other suitable communications networks or paths. If desired, the components of set-top box 1504 may be integrated into other user equipment (e.g., a television or video recording device, video recorder or other recording device).

Recording device 1506 may be used to record videos provided by set-top box 1504. For example, if set-top box 1504 is tuned to a given television channel, the video signal for that television channel may be passed to recording device 1506 for recording on a videocassette, compact disc, digital video disk, or internal hard drive or other storage device. In some embodiments, recording device 1506 may be configured to record either standard-definition television programs or high-definition television programs. In some embodiments, recording device 1506 may be configured to record standard-definition television programs and/or high-definition television programs depending on what a user may select at option 914 shown in FIG. 9. Recording device 1506 may have communications circuitry such as a cable modem, an ISDN modem, a DSL modem, or a telephone modem for communications with other equipment. Such communications may involve the Internet or any other suitable communications networks or paths, such as when a missed episode desired by the user to be included in a series aggregation may be downloaded from the Internet. The components of recording device 1506 may be integrated into other user equipment (e.g., a television, stereo equipment, etc.).

Recording device 1506 may be controlled using a remote control or other suitable user interface. If desired, video recorder functions such as start, stop, record and other functions for device 1506 may be controlled by set-top box 1504. For example, set-top box 1504 may control recording device 1506 using infrared commands directed toward the remote control inputs of recording device 1506 or set-top box 1504 may control recording device 1506 using other wired or wireless communications paths between box 1504 and device 1506.

The output of recording device 1506 may be provided to television 1508 for display to the user. In some embodiments, television 1508 may be capable of displaying high-definition programming (i.e., HDTV-capable). If desired, multiple recording devices 1506 may be used for multiple aggregations or no recording device 1506 may be used. If recording device 1506 is not present or is not being actively used, the video signals from set-top box 1504 may be provided directly to television 1508. Any suitable television or monitor may be used to display the video. For example, if the video is in a high-definition format, an HDTV-capable television or monitor is required to display the video. In the equipment of FIG. 15 and the other equipment of system 1400 (FIG. 14), the audio associated with various video items is typically distributed with those video items and is generally played back to the user as the videos are played. In some embodiments, the audio may be distributed to a receiver (not shown), which processes and outputs the audio via external speakers (not shown).

Figure 16:
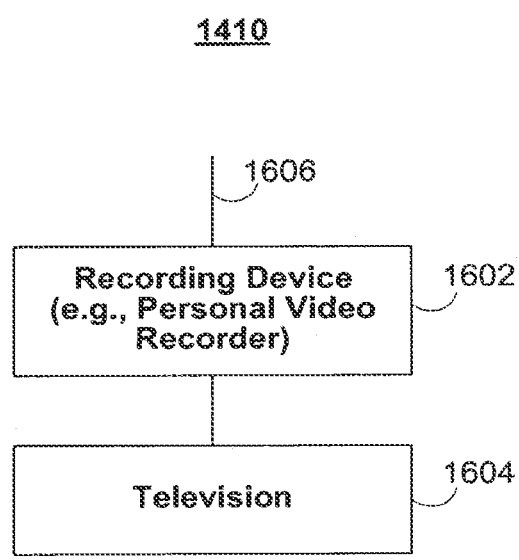
FIG. 16 is a diagram of additional illustrative user television equipment in accordance with the present invention.

Another illustrative arrangement for user television equipment 1410 (FIG. 14) is shown in FIG. 16. User television equipment 1410 may be stand-alone or a part of home network 1413 (FIG. 14). In the example of FIG. 16, user television equipment 1410 includes a recording device 1602 such as a digital video recorder (e.g., a personal video recorder (PVR)) that uses a hard disk or other storage for recording video or missed episodes desired by a user to be in a series aggregation, for example, at step 108 shown in FIG. 1. Recording device 1602 may alternatively be a digital video disc recorder, compact disc recorder, video recording device, video recorder, or other suitable recording device. Equipment 1410 of FIG. 16 may also include a television 1604. In some embodiments, television 1604 may be HDTV-capable. Input/output 1606 may be connected to communications paths such as paths 1416 and 1436 (FIG. 14). Television programming, program schedule data, and other data (e.g., advertisement data, data indicating one or more television channels for which the display of an overlay is to be customized, episode identifiers (such as those of data structures 300 and 400 of FIGS. 3 and 4), etc.) may be received using input/output 1606. Commands and requests and other data received from the user through a remote control may be transmitted over input/output 1606.

Recording device 1602 may contain at least one analog tuner for tuning to a desired analog television channel (e.g., to display video for a given television channel to a user, to receive program guide data and other data) and multiple other tuners may also be provided. Recording device 1602 may also contain digital decoding circuitry for receiving digital television programming, music programming, program guide data, and other data on one or more digital channels. Recording device 1602 may also contain circuitry for receiving high-definition television channels, for example, if a user has selected to create a series aggregation from high-definition channels through option 914 shown in FIG. 9. If desired, recording device 1602 may contain circuitry for handling analog, digital, and high-definition channels. Recording device 1602 also contains a processor (e.g., a microcontroller or microprocessor or the like) that is used to execute software applications. Recording device 1602 may contain memory such as random-access memory for use when executing applications. Nonvolatile memory may also be used to store a boot-up routine or other instructions. The hard disk and other storage in recording device 1602 may be used to support databases (e.g., program guide databases, series aggregation information databases or other interactive television application databases). The hard disk or other storage in recording device 1602 may also be used to record video such as television programs or video-on-demand content or other content provided to recording device 1602 over input/output 1606. Recording device 1602 may also store series aggregation information and episode identifiers for episodes that are part of a series aggregation, such as data structures 200, 300, and 400 of FIGS. 2, 3, and 4, respectively. Episode identifiers such as those in data structure 400 of FIG. 4 may be stored on recording device 1602 with its corresponding episode or as part of a separate storage database such as series aggregation information databases.

Recording device 1602 may have IR communications circuitry or other suitable communications circuitry for communicating with a remote control. Recording device 1602 may also have dedicated buttons and a front-panel display. The front-panel display may, for example, be used to display the current channel to which the recording device is tuned.

Recording device 1602 may also have communications circuitry such as a cable modem, an ISDN modem, a DSL modem, a telephone modem, or a wireless modem for communications with other equipment. Such communications may involve the Internet or other suitable communications networks or paths.

If desired, recording device 1302 may include a satellite receiver or other equipment that has wireless communications circuitry for receiving satellite signals.

Recording device 1602 of FIG. 16 or recording device 1506 of FIG. 15 may record new video while previously recorded video is being played back on television 1604 or 1508. This allows users to view video while episodes are being recorded in accordance with aggregation priorities set at option 902 shown in FIG. 9. Users may also press a pause button during normal television viewing. When the pause button is pressed, the current television program is stored on the hard disk of digital video recorder 1602. When the user presses play, the recorded video may be played back. This arrangement allows the user to pause and to resume television viewing seamlessly. Recording devices 1602 and 1506 may also be used to present a previously-recorded program while simultaneously recording a new program.

The set-top box arrangement of FIG. 15 and the personal video recorder with a built-in set-top box arrangement of FIG. 16 are merely illustrative. Other arrangements may be used if desired. For example, user television equipment may be based on a WebTV box, a personal computer television (PC/TV), or any other suitable television equipment arrangement. If desired, the functions of components such as set-top box 1504, recording device 1602, a WebTV box, or PC/TV or the like may be integrated into a television or personal computer or other suitable device.

Figure 17:
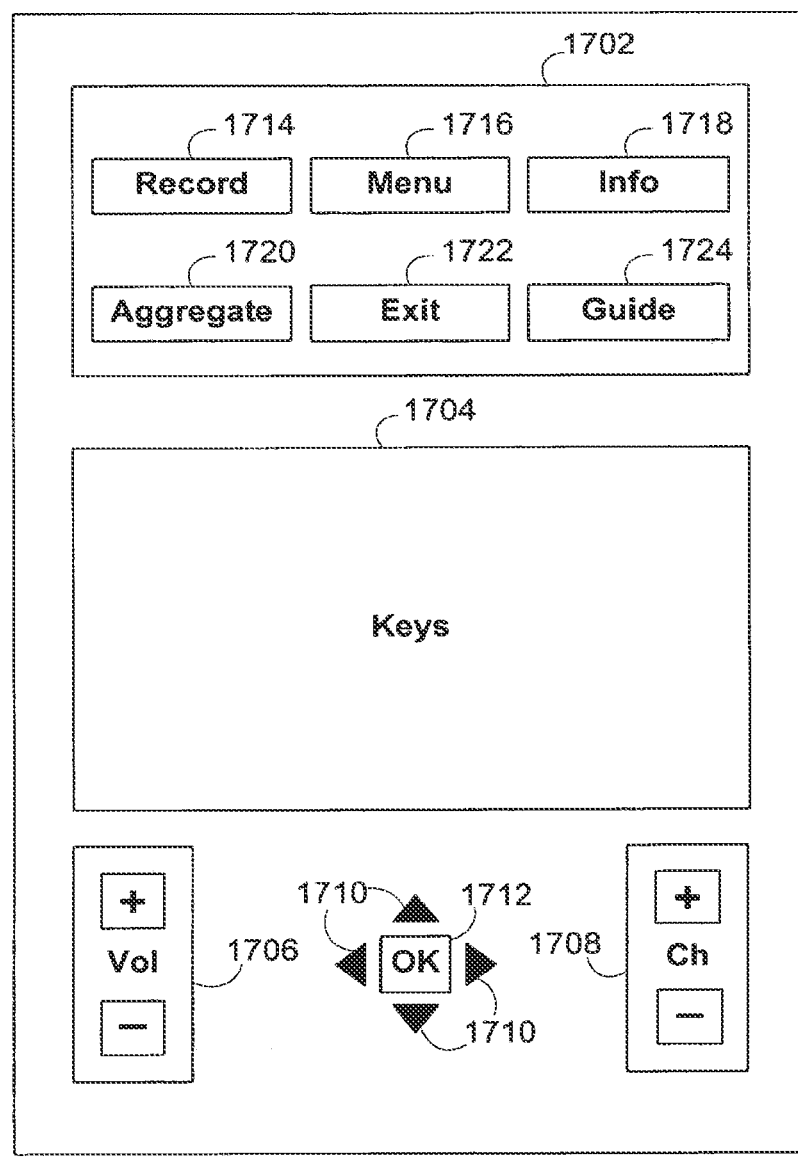
FIG. 17 is a diagram of an illustrative remote control in accordance with the present invention.

An illustrative remote control 1700 for operating user television equipment 1410 (FIG. 14) or suitable user computer equipment 1412 is shown in FIG. 17. Remote control 1700 is only illustrative and any other suitable user input interface may be used to operate user equipment (e.g., a mouse, trackball, keypad, keyboard, touch screen, voice recognition system, etc.). Remote control 1700 may have function keys 1702 and other keys 1704 such as keypad keys, power on/off keys, pause, stop, fast-forward and reverse keys. Volume up and down keys 1706 may be used for adjusting the volume of the audio portion of a video. Channel up and down keys 1708 may be used to change television channels and to access content on virtual channels. Cursor keys 1710 may be used to navigate on-screen menus or interactive displays, such as those shown in FIGS. 5-13. For example, cursor keys 1410 may be used to position an on-screen cursor, indicator, or highlight (sometimes all generically referred to herein as a highlight or highlight region) to indicate interest in a particular option (e.g., 902-619, FIG. 9) or other item on a display screen that is displayed by the interactive television application.

OK key 1712 (sometimes called a select or enter key) may be used to select on-screen options that the user has highlighted. In one embodiment, the OK key 1712 can be used to indicate interest in changing the order of priority for series aggregations. For example, when an aggregation priority option (902, FIG. 9) appears on a display screen, a user can press the OK key 1712 shown in FIG. 17 to indicate interest in changing the order of priority for series aggregations. In response, an interactive screen such as that shown in FIG. 10 can appear.

Keys 1702 may include RECORD key 1714 for initiating recordings. MENU button 1716 may be used to direct an interactive media guidance application to display a menu on the user's display screen (e.g., on television 1508 or 1604 or on a suitable monitor or computer display). INFO button 1718 may be used to direct an interactive media guidance application to display an information display screen. For example, when a user presses INFO key 1718 while video for a given television channel is displayed for the user, an interactive television program guide may display a FLIP/BROWSE overlay including program schedule information for the current program on the given television channel on top of the video. As another example, when a particular program listing in an interactive television program listings display screen is highlighted, the user pressing INFO button 1718 may cause an interactive television program guide to provide additional program information associated with that program listing (e.g., a program description, actor information, schedule information, etc.).

AGGREGATE button 1720 may be used to indicate a desire to create a series aggregation. For example, a user may use AGGREGATE button 1720 or on-screen options to establish series aggregation settings for the interactive media guidance application. The series aggregation settings may be any of the settings provided in series aggregation setup display screen 700 shown in FIG. 7 or any other suitable settings (e.g., display screen 900 of FIG. 9). AGGREGATE button 1720 may be selected when, for example, a program is being viewed. AGGREGATE button 1720 may also be selected when, for example, program information display screen 600 shown in FIG. 6 is displayed. AGGREGATE button 1720 may also be selected when, for example, program listings display screen 500 shown in FIG. 5 is displayed. Once AGGREGATE button 1720 has been selected, the interactive media guidance application may display series aggregation setup display screen 700 shown in FIG. 7 and allow the user to be set up the series aggregation.

EXIT button 1722 may be used to exit the interactive media guidance application or to exit a portion of the interactive media guidance application (e.g., to cause an interactive television program guide to remove a FLIP, BROWSE, or other interactive television overlay from the display screen). In one example, EXIT button 1722 can be associated with an exit option in a series aggregation setup display screen (e.g., 700, FIG. 7). GUIDE button 1724 may be used to invoke an interactive television program guide (e.g., a program guide menu screen, program listings screen, or other program guide screen).

The keys shown in FIG. 17 are merely illustrative. Other keys or buttons may be provided if desired. For example, a music button may be used to access music with the interactive media guidance application. An edit button may be used to edit stored content (e.g., to remove commercials, remove portions of a video, etc.). Alphanumeric buttons may be used to enter alphanumeric characters. A last or back button may be used to browse backward in the interactive media guidance application (e.g., to return to a previous channel, web page, or other display screen). Video recorder function buttons such as a play button, pause button, stop button, rewind button, fast-forward button, and record button, may be used to control video recorder functions (local or network-based) in system 1400 (FIG. 14). A help key may be used to invoke help functions such as context-sensitive on-screen help functions.

Figure 18:
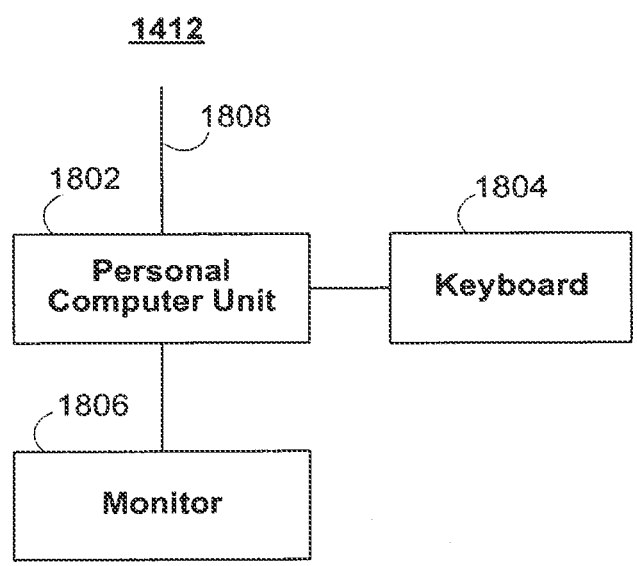
FIG. 18 is a diagram of illustrative user computer equipment in accordance with the present invention.

Illustrative user computer equipment 1412 (FIG. 14) is shown in FIG. 18. User computer equipment 1412 may be stand-alone or a part of home network 1413 (FIG. 14). In the arrangement of FIG. 18, personal computer unit 1802 may be controlled by the user using keyboard 1804 and/or other suitable user input device such as a trackball, mouse, touch pad, touch screen, voice recognition system, or a remote control, such as remote control 1700 of FIG. 17. Video content, such as television programming or web pages having video elements, and interactive media guidance application display screens may be displayed on monitor 1506. Television and music programming, media guidance application data (e.g., television program guide data), video-on-demand content, video recordings played back from a network-based video recorder, and other data may be received from paths 1418 and 1438 (FIG. 14) using input/output 1808. User commands and other information generated as a result of user interactions through a remote control with the interactive media guidance application and system 1400 (FIG. 14) may also be transmitted over input/output 1808.

Personal computer unit 1802 may contain a television or video card, such as a television tuner card, for decoding analog, digital, and high-definition television channels and for handling streaming video content. Multiple video cards (e.g., tuner cards) may be provided if desired. An illustrative television tuner card that may be used may contain an analog television tuner for tuning to a given analog channel, digital decoding circuitry for filtering out a desired digital television or music channel from a packetized digital data stream, and a high-definition television tuner for tuning to a high-definition channel, for use, for example, when a user selects to create a series aggregation from high-definition channels in option 914 shown in FIG. 9. Any suitable card or components in computer unit 1802 may be used to handle video and other content delivered via input/output line 1808 if desired.

Personal computer unit 1802 may contain one or more processors (e.g., microprocessors) that are used to run the interactive media guidance application or a portion of the interactive media guidance application.

Personal computer unit 1802 may include a hard drive, a recordable DVD drive, a recordable CD drive, or other suitable storage device or devices that stores video, program guide data, and other content such as missed episodes desired by a user to be in a series aggregation. The interactive media guidance application and personal computer unit 1802 may use a storage device or devices to, for example, provide the functions of a personal video recorder.

User equipment, such as user equipment 1408, user television equipment 1410, user computer equipment 1412, and user equipment located on home network 1413 (FIG. 14), may be used with network equipment such as server 1430, server 1440, a home network server, and equipment at service providers such as service provider 1442 of FIG. 14 to provide network-based video recording functions. Video recording functions may be provided by storing copies of television programs and other video content on a remote server (e.g., server 1430 or server 1440 or a home network server) or other network-based equipment, such as equipment at a service provider such as service provider 1442.

Video recordings may be made in response to user commands that are entered at user equipment 1408 or user equipment located on home network 1413 (FIG. 14). In a personal video recorder arrangement, the interactive media guidance application may be used to record video locally on the user equipment in response to the user commands. In a network-based video recorder arrangement, the interactive media guidance application may be used to record video or to make virtual recordings (described below) on network equipment such as server 1430, server 1440, a home network server, or equipment at service provider 1442 in response to the user commands. The user commands may be provided to the network equipment over the communications paths shown in FIG. 14. The personal video recorder arrangement and the network-based video recorder arrangement can support functions such as fast-forward, rewind, pause, play, and record.

To avoid unnecessary duplication in a network-based video recorder environment, system 1400 may provide network-based video recording capabilities by using virtual copies or recordings. With this approach, each user may be provided with a personal area on the network that contains a list of that user's recordings. The video content need only be stored once (or a relatively small number of times) on the network equipment, even though a large number of users may have that video content listed as one of their recordings in their network-based video recorder personal area. Personal settings or any other suitable data may be stored in a user's personal area on the network.

Figure 19:
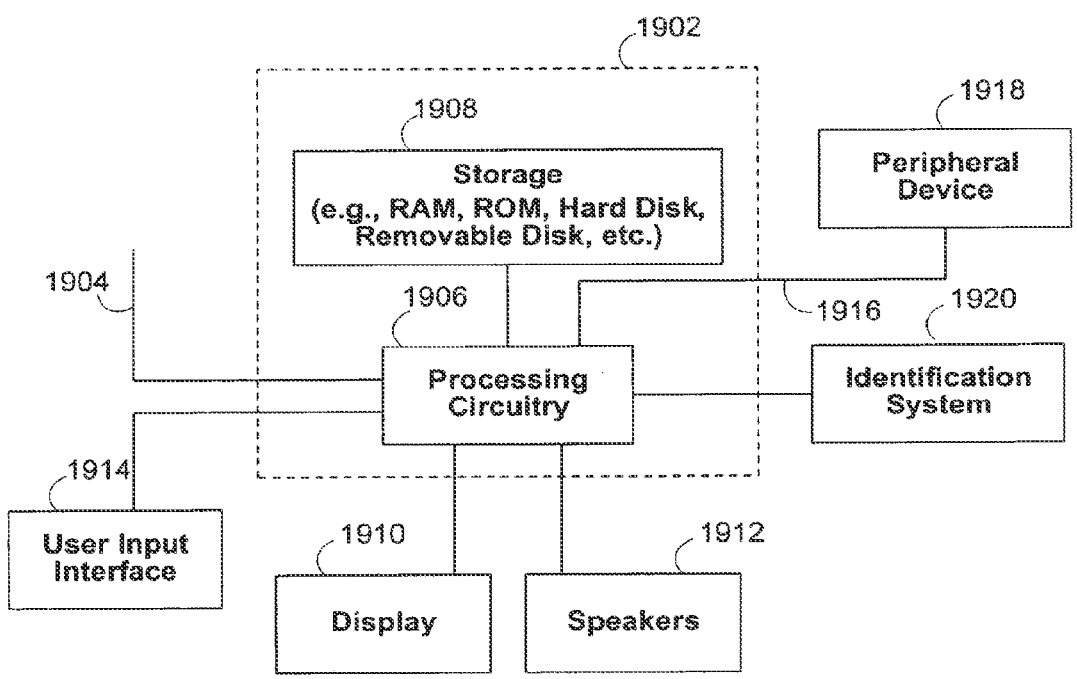
FIG. 19 is a generalized diagram of illustrative user equipment in accordance with the present invention.

The user television equipment and user computer equipment arrangements described above are merely illustrative. A more generalized embodiment of illustrative user equipment 1408, 1410, and 1412 (FIG. 14) and user equipment located on home network 1413 (FIG. 14) is shown in FIG. 19. Control circuitry 1902 is connected to input/output 1604. Input/output 1904 may be connected to one or more communications paths such as paths 1414, 1416, 1418, 1428, 1436, and 1438 of FIG. 14. Media (e.g., television programming, music programming, other video and audio, and web pages) may be received via input/output 1904 (e.g., from programming sources 1402, servers or other equipment, such as server 1430, service providers such as service provider 1442, distribution facility 1404, etc.). Interactive media guidance application data, such as program schedule or series program episode information for an interactive television program guide, may be received from data source 1420 via input/output 1904. Input/output 1904 may also be used to receive data from data source 1420 for other interactive television applications. The user may use control circuitry 1902 to send and receive commands, requests, and other suitable data (e.g., series program episode information) using input/output 1904.

Control circuitry 1902 may be based on any suitable processing circuitry 1906 such as processing circuitry based on one or more microprocessors, microcontrollers, digital signal processors, programmable logic devices, etc. In some embodiments, control circuitry 1902 executes instructions for an interactive media guidance application or other interactive application (e.g., web browser) from memory. In client-server based embodiments, control circuitry 1902 may include communications circuitry suitable for communicating with a guidance application server, such as server 1440 of FIG. 14.

Memory (e.g., random-access memory and read-only memory), hard drives, optical drives, or any other suitable memory or storage devices may be provided as storage 1908 that is part of control circuitry 1902. Tuning circuitry such as one or more analog tuners, one or more MPEG-2 decoders or other digital video circuitry, high-definition tuners, or any other suitable tuning or video circuits or combinations of such circuits may also be included as part of circuitry 1902, for use, for example, when a user desires to replace a standard-definition format of an episode recorded on user equipment device with a high-definition format of the same episode. Encoding circuitry (e.g., for converting over-the-air, analog, or digital signals to MPEG signals for storage) may also be provided. The tuning and encoding circuitry may be used by the user equipment to receive and to display, to play, or to record a particular television or music channel or other desired audio and video content (e.g., video-on-demand content or requested network-based or local video recorder playback). Television programming and other video and on-screen options and information (e.g., interactive screens of FIGS. 5-13) may be displayed on display 1910. Display 1910 may be a monitor, a television, or any other suitable equipment for displaying visual images. In some embodiments, display 1910 may be HDTV-capable. Speakers 1912 may be provided as part of a television or may be stand-alone units. Digital music and the audio component of videos displayed on display 1910 may be played through speakers 1912. In some embodiments, the audio may be distributed to a receiver (not shown), which processes and outputs the audio via speakers 1912.

A user may control the control circuitry 1902 using user input interface 1914. User input interface 1914 may be any suitable user interface, such as a mouse, trackball, keypad, keyboard, touch screen, touch pad, voice recognition interface, or a remote control.

Peripheral device 1918 may also be connected to processing circuitry 1906 over communications path 1916. Peripheral devices may include cellular phones, personal data assistants, handheld media players, and any other suitable peripheral device. Communications path 1916 may include for example, USB cables, IEEE 1394 cables, or wireless paths (e.g., Bluetooth, infrared). Processing circuitry 1906 may provide content and data to peripheral device 1918.

It should be understood by one skilled in the art that media guidance applications may also record the episodes in formats that are suitable for display by peripheral devices connected to user equipment devices without departing from the scope of the present invention. The user equipment devices may transfer the suitable formats of the content to the peripheral devices to which they are connected.

In some embodiments, the media guidance application may adjust the format of recorded episodes based on the capabilities of the user equipment device accessing the episodes. For example, the display format of some media may be different when played back by a laptop computer, I-Video device, media player, mobile phone, personal digital assistant (PDA), or BlackBerry™. In some embodiments, the media guidance application may record missed episodes in the highest definition format available, and may translate the display format into a smaller size or resolution appropriate for the accessing device.

The foregoing is merely illustrative of the principles of this invention and various modifications can be made by those skilled in the art without departing from the scope and spirit of the invention. The embodiments described herein are presented for purposes of illustration and not of limitation, and the invention is limited only by the claims which follow.

What is claimed is:

1. A method for presenting episodes of a series for a user, the method comprising:
    receiving, with control circuitry, a user selection of an aggregation of a plurality of episodes of a series;
    collecting the aggregation of the plurality of episodes of the series from more than one media source for viewing by the user;
    notifying the user, without receiving further user input, in response to determining that the selected aggregation of the plurality of episodes of the series has become available for viewing in the order in which they were originally made available, the notifying indicates that the selected aggregation of the plurality of episodes of the series has become available for viewing; and
    generating a presentation of the aggregation of the plurality of episodes of the series in the order in which they were originally made available.

2. The method of claim 1, further comprising:
    notifying the user when each episode of the series becomes available for viewing in the order in which they were originally made available; and
    presenting a sequence of episodes of the series, wherein the sequence of episodes includes the beginning episodes of the series.

3. The method of claim 1, further comprising providing the user with a plurality of options for collecting the aggregation of the plurality of episodes of the series, the plurality of options comprising at least:
    a first option that does not require any additional payment and collects the aggregation of the plurality of episodes of the series from free sources; and
    a second option that does require additional payment and collects at least one episode of the series from at least one of a plurality of different media sources that are not free.

4. The method of claim 3, wherein the plurality of different media sources that are not free comprises at least two of:
    a broadcast provider that is not free;
    a cable provider that is not free;
    a satellite provider that is not free;
    a video-on-demand (VOD) server that is not free;
    a pay-per-view provider;
    a DVD provider;
    the Internet;
    the user's digital video recorder; and
    a telephone.

5. The method of claim 1, wherein receiving the user selection of the aggregation of the plurality of episodes of the series comprises automatically receiving the user selection of episodes of the series for a season, wherein the selected aggregation of the plurality of episodes are in the season.

6. The method of claim 1, wherein collecting the aggregation of the plurality of episodes of the series comprises:
    identifying the aggregation of the plurality of episodes of the series to be collected;
    identifying the aggregation of the plurality of episodes of the series that are already available to the user; and
    identifying and recording the aggregation of the plurality of episodes of the series that will be available for recording.

7. The method of claim 6, wherein:
    identifying the aggregation of the plurality of episodes of the series to be collected comprises including the identified episodes in a list of missed episodes;
    identifying the aggregation of the plurality of episodes of the series that are already available to the user comprises removing the episodes that are already available from the list of missed episodes; and
    identifying and recording the aggregation of the plurality of episodes of the series that will be available for recording further comprises removing the recorded episodes from the list of missed episodes.

8. The method of claim 1, wherein collecting the aggregation of the plurality of episodes of the series for viewing by the user comprises collecting the aggregation of the plurality of episodes of the series out of the order in which they were originally made available for viewing by the user.

9. The method of claim 1, wherein a first episode of the plurality of episodes is received after a second episode of the plurality of episodes, and wherein the first episode was originally made available before the second episode, further comprising ordering the selected aggregation of the plurality of episodes to cause the second episode to be generated for presentation before the first episode.

10. A system for presenting episodes of a series in the order in which they were originally made available for a user, comprising:
an interactive media guidance application implemented at least partially on control circuitry configured to:
collect a user selected aggregation of a plurality of episodes of a series from more than one media source for viewing by a user; and
notify the user, without receiving further user input, in response to determining that a user selected aggregation of the plurality of episodes of the series has become available for viewing in the order in which they were originally made available, the notification indicates that the selected aggregation of the plurality of episodes of the series has become available for viewing.

11. The system of claim 10, wherein the control circuitry is further configured to:
receive a user selection of the aggregation of the plurality of episodes of a series; and
present the aggregation of the plurality of episodes of the series in the order in which they were originally made available.

12. The system of claim 11, wherein presenting the control circuitry is further configured to:
notify the user when each episode of the series becomes available for viewing in the order in which they were originally made available; and
present a sequence of episodes of the series, wherein the sequence of episodes includes the beginning episodes of the series.

13. The system of claim 10, wherein the control circuitry is further configured to provide the user with a plurality of options for collecting the aggregation of the plurality of episodes of the series, the plurality of options comprising at least:
a first option that does not require any additional payment and collects the aggregation of the plurality of episodes of the series from free sources; and
a second option that does require additional payment and collects at least one episode of the series from at least one of a plurality of different media sources that are not free.

14. The system of claim 13, wherein the plurality of different media sources that are not free comprises at least two of:
a broadcast provider that is not free;
a cable provider that is not free;
a satellite provider that is not free;
a video-on-demand (VOD) server that is not free;
a pay-per-view provider;
a DVD provider;
the Internet;
the user's digital video recorder; and
a telephone.

15. The system of claim 11, wherein the control circuitry is further configured to automatically receive the user selection of the aggregation of the plurality of episodes of the series for a season, wherein the selected aggregation of the plurality of episodes are in the season.

16. The system of claim 10, wherein the control circuitry is further configured to:
identify the aggregation of the plurality of episodes of the series to be collected;
identify the aggregation of the plurality of episodes of the series that are already available to the user; and
identify and record the aggregation of the plurality of episodes of the series that will be available for recording.

17. The system of claim 16, wherein the control circuitry is further configured to:
include the identified episodes to be collected in a list of missed episodes;
remove the episodes that are already available from the list of missed episodes; and
remove the recorded episodes from the list of missed episodes.

18. The system of claim 10, wherein the control circuitry is further configured to collect the aggregation of the plurality of episodes of the series out of the order in which they were originally made available for viewing by the user.

19. The system of claim 10, wherein a first episode of the plurality of episodes is received after a second episode of the plurality of episodes, and wherein the first episode was originally made available before the second episode, wherein the control circuitry is further configured to order the selected aggregation of the plurality of episodes to cause the second episode to be generated for presentation before the first episode.

20. A method for presenting episodes of a series for a user, the method comprising:
receiving, with control circuitry, a user selection of an aggregation of a plurality of episodes of a series from a user;
in response to the user selection, transmitting to a remote server a request to collect the aggregation of the plurality of episodes of the series from more than one media source for viewing by the user;
receiving from the remote server data indicating the collected aggregation of the plurality of episodes;
notifying the user, without receiving further user input, in response to determining that the selected aggregation of the plurality of episodes of the series has become available for viewing in the order in which they were originally made available, the notifying indicates that the selected aggregation of the plurality of episodes of the series has become available for viewing; and
generating a presentation of the aggregation of the plurality of episodes of the series in the order in which they were originally made available.

21. The method of claim 20, further comprising:
notifying the user when each episode of the series become available for viewing in the order in which they were originally made available; and
presenting a sequence of episodes of the series, wherein the sequence of episodes includes the beginning episodes of the series.

22. The method of claim 20, further comprising providing the user with a plurality of options for collecting the aggregation of the plurality of episodes of the series, the plurality of options comprising at least:
a first option that does not require any additional payment and collects the aggregation of the plurality of episodes of the series from free sources; and a second option that does require additional payment and collects at least one episode of the series from at least one of a plurality of different media sources that are not free.

23. The method of claim 22, wherein the plurality of different media sources that are not free comprises at least two of:
   a broadcast provider that is not free;
   a cable provider that is not free;
   a satellite provider that is not free;
   a video-on-demand (VOD) server that is not free;
   a pay-per-view provider;
   a DVD provider;
   the Internet;
   the user's digital video recorder; and
   a telephone.

24. The method of claim 20, wherein receiving the user selection of the aggregation of the plurality of episodes of the series comprises automatically receiving the selection of the aggregation of the plurality of episodes of the series for a season, wherein the selected aggregation of the plurality of episodes are in the season.

25. The method of claim 20, wherein collecting the aggregation of the plurality of episodes of the series comprises:
   identifying the aggregation of the plurality of episodes of the series to be collected;
   identifying the aggregation of the plurality of episodes of the series that are already available to the user; and
   identifying and recording the aggregation of the plurality of episodes of the series that will be available for recording.

26. The method of claim 25, wherein:
   identifying the aggregation of the plurality of episodes of the series to be collected comprises including the identified episodes in a list of missed episodes;
   identifying the aggregation of the plurality of episodes of the series that are already available to the user comprises removing the episodes that are already available from the list of missed episodes; and
   identifying and recording the aggregation of the plurality of episodes of the series that will be available for recording further comprises removing the recorded episodes from the list of missed episodes.

27. The method of claim 20, wherein collecting the aggregation of the plurality of episodes of the series for viewing by the user comprises collecting the aggregation of the plurality of episodes of the series out of the order in which they were originally made available for viewing by the user.

28. The method of claim 20, wherein a first episode of the plurality of episodes is received after a second episode of the plurality of episodes, and wherein the first episode was originally made available before the second episode, further comprising ordering the selected aggregation of the plurality of episodes to cause the second episode to be generated for presentation before the first episode.

29. A system for presenting episodes of a series for a user, comprising:
   an interactive media guidance application implemented at least partially on control circuitry configured to:
   receive a user selection of an aggregation of a plurality of episodes of a series from a user;
   in response to the user selection, transmit to a remote server a request to collect the aggregation of the plurality of episodes of the series for viewing by the user;
   receive from the remote server data indicating the collected aggregation of the plurality of episodes from more than one media source;
   notify the user, without receiving further user input, in response to determining that the selected aggregation of the plurality of episodes of the series has become available for viewing in the order in which they were originally made available, the notification indicates that the selected aggregation of the plurality of episodes of the series has become available for viewing; and
   generate a presentation of the aggregation of the plurality of episodes of the series in the order in which they were originally made available.

30. The system of claim 29, wherein the control circuitry is further configured to:
   notify the user when each episode of the series become available for viewing in the order in which they were originally made available; and
   present a sequence of episodes of the series, wherein the sequence of episodes includes the beginning episodes of the series.

31. The system of claim 29, wherein the control circuitry is further configured to provide the user with a plurality of options for collecting the aggregation of the plurality of episodes of the series, the plurality of options comprising at least:
   a first option that does not require any additional payment and collects the aggregation of the plurality of episodes of the series from free sources; and
   a second option that does require additional payment and collects at least one episode of the series from at least one of a plurality of different media sources that are not free.

32. The system of claim 31, wherein the plurality of different media sources that are not free comprises at least two of:
   a broadcast provider that is not free;
   a cable provider that is not free;
   a satellite provider that is not free;
   a video-on-demand (VOD) server that is not free;
   a pay-per-view provider;
   a DVD provider;
   the Internet;
   the user's digital video recorder; and
   a telephone.

33. The system of claim 29, wherein the control circuitry is further configured to automatically receive the user selection of the aggregation of the plurality of episodes of the series for a season, wherein the selected aggregation of the plurality of episodes are in the season.

34. The system of claim 29, wherein the control circuitry is further configured to:
   identify the aggregation of the plurality of episodes of the series to be collected;
   identify the aggregation of the plurality of episodes of the series that are already available to the user; and
   identify and record the aggregation of the plurality of episodes of the series that will be available for recording.

35. The system of claim 34, wherein the control circuitry is further configured to:
   include the identified aggregation of the plurality of episodes to be collected in a list of missed episodes;
   remove the aggregation of the plurality of episodes that are already available from the list of missed episodes; and
   remove the recorded episodes from the list of missed episodes.

36. The system of claim 29, wherein the control circuitry is further configured to collect the aggregation of the plurality of episodes of the series out of the order in which they were originally made available for viewing by the user.

37. The system of claim 29, wherein a first episode of the plurality of episodes is received after a second episode of the plurality of episodes, and wherein the first episode was originally made available before the second episode, wherein the control circuitry is further configured to order the selected aggregation of the plurality of episodes to cause the second episode to be generated for presentation before the first episode.

\* \* \* \* \*